United States Patent [19]

Chelstowski et al.

[11] Patent Number: 5,461,712
[45] Date of Patent: Oct. 24, 1995

[54] QUADRANT-BASED TWO-DIMENSIONAL MEMORY MANAGER

[75] Inventors: Iliese C. Chelstowski, Woodstock; Patrick R. Brown, Kingston, both of N.Y.

[73] Assignee: International Business Machines Corporation, Armonk, N.Y.

[21] Appl. No.: 228,781

[22] Filed: Apr. 18, 1994

[51] Int. Cl.[6] .................................................. G06F 12/00
[52] U.S. Cl. ............................................. 395/164; 395/160
[58] Field of Search ..................................... 395/119, 121, 395/125–127, 129, 130, 157, 160, 162–164, 425; 345/55, 189, 191, 196; 382/54, 56

[56] References Cited

U.S. PATENT DOCUMENTS

| | | | |
|---|---|---|---|
| 4,225,861 | 9/1980 | Langdon, Jr. et al. | 395/22 |
| 4,615,013 | 9/1986 | Yan et al. | 345/130 |
| 4,692,880 | 9/1987 | Merz et al. | 395/130 |
| 4,694,404 | 9/1987 | Meagher et al. | 395/127 |
| 4,727,365 | 2/1988 | Bunker et al. | 345/139 |
| 4,855,934 | 8/1989 | Robinson | 395/130 |
| 4,885,703 | 12/1989 | Deering | 395/122 |
| 4,888,713 | 12/1989 | Falk | 395/125 |
| 4,905,164 | 2/1990 | Chandler et al. | 395/131 |
| 4,935,879 | 6/1990 | Ueda | 395/130 |
| 4,945,495 | 7/1990 | Ueda | 395/130 |
| 4,972,319 | 11/1990 | Delorme | 340/990 |
| 5,029,225 | 7/1991 | Ueda | 382/28 |
| 5,030,117 | 7/1991 | Delorme | 434/130 |
| 5,097,427 | 3/1992 | Lathrop et al. | 395/130 |
| 5,222,205 | 6/1993 | Larson et al. | 395/130 |

FOREIGN PATENT DOCUMENTS

| | | | |
|---|---|---|---|
| 0438195A2 | 1/1991 | European Pat. Off. | G06F 15/72 |
| 0476533A2 | 9/1991 | European Pat. Off. | G06F 15/72 |

*Primary Examiner*—Mark R. Powell
*Assistant Examiner*—Kee M. Tung
*Attorney, Agent, or Firm*—Mark S. Walker

[57] ABSTRACT

A computer graphics system simultaneously stores graphical storage areas of variable size in a two-dimensionally addressed graphics memory. The storage areas contain data corresponding to two-dimensional graphical images such as, for example, texture maps, mip maps, bit maps, or fonts. The graphics system manages the storage areas within the graphics memory using a quadtree that indicates the current storage state thereof. Using the quadtree, a memory manager divides the graphics memory address space into a first level of quadrants of equal two-dimensional size. The size of a storage area to be placed into the memory is compared with the size of the first level quadrants. If size is equal, then the storage area is placed into one of the quadrants. Otherwise, the memory manager further subdivides the graphics memory into quadrants on one or more descending levels as necessary to store the storage area within.

32 Claims, 16 Drawing Sheets

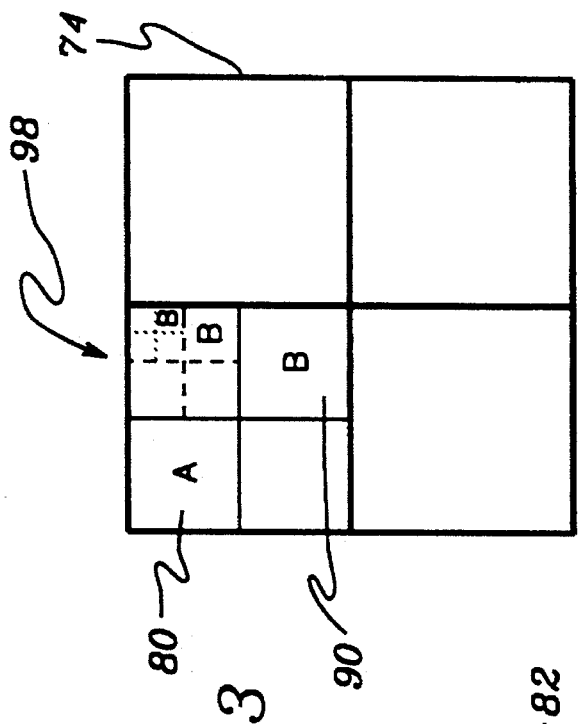
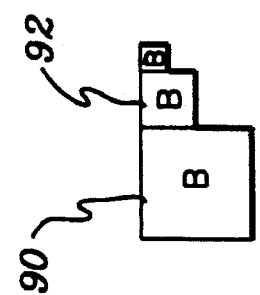
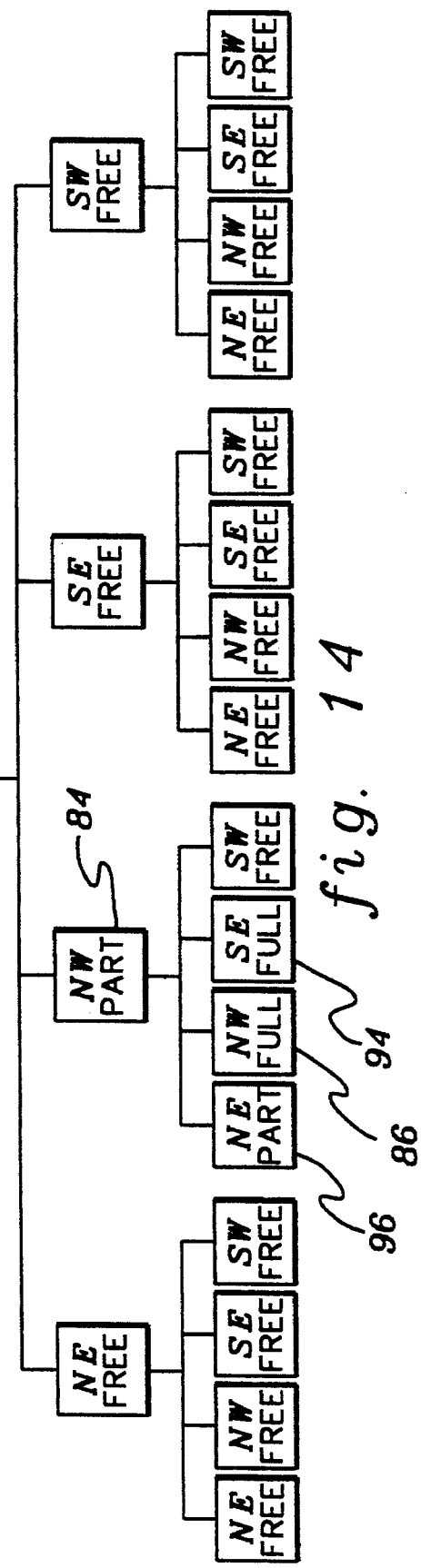
fig. 13
fig. 12
fig. 14

QUADRANT-BASED TWO-DIMENSIONAL MEMORY MANAGER

FIELD OF THE INVENTION

The present invention relates generally to digital computers and, in particular, to computer graphics systems that support texture mapping during the processing of graphics data for three-dimensional objects.

DESCRIPTION OF THE PRIOR ART

An important application of computer graphics involves the creation of realistic images of three-dimensional, real-world objects. Designers of three-dimensional objects such as automobiles, aircraft, and other structures may wish to have a visual representation of a preliminary design to facilitate implementation of interactive design changes prior to the prototype stage. Creating realistic computer-generated images is a faster, less expensive, and more effective method of evaluating preliminary designs than is constructing models and prototypes. In particular, computer generated images allow a greater number of alternative designs to be evaluated in a shorter time period. Often, the design work itself is performed on a computer graphics system, using a computer-aided design (CAD) or other engineering workstation. In such a case, a digitized representation of the three-dimensional object is already available to use as the basis for the computer generated image. Conventionally, this representation may be a collection of primitives, such as triangles, that closely approximate the shape of the object. In addition, another application for computer generated three-dimensional images is their use in simulation systems, which utilize images that not only must appear realistic, but that also must change dynamically.

Visual realism in computer generated images may sometimes be improved by providing surface detail. An important technique often used to provide such detail is texture mapping. Several aspects are conventionally encompassed by texture mapping. For example, in one aspect called bump mapping, the appearance of roughness is added to a surface. Also, in an aspect called alpha mapping, different degrees of transparency are incorporated in a surface. In another aspect, a separately-specified two-dimensional color image is added to a surface. These and other aspects of texture mapping may be used separately or in varying combinations. Usually, the surface detail to be incorporated is typically stored as a set of values in a two-dimensional array called a texture map, but in other cases, a texture map may be defined by a three-dimensional array. The graphics memory storing the texture map during mapping is called the texture buffer.

An important advantage of texture mapping is that it permits a large amount of surface detail to be represented without a corresponding increase in the number of primitives that must be rendered to produce an image. In a simple case, the stored texture map defines the color of an object's surface so that the map's texture elements, which are also known as "texel" values, correspond to color values. In other cases, the texture map defines vectors used to add roughness as in bump mapping or alpha values used to calculate transparency as in alpha mapping. In a more general case, the texel values may be subjected to or otherwise control further processing, such as to permit the rapid calculation of complex lighting variations or reflections.

An example of conventional texture mapping is a computer graphics rendering of the label on a soft drink can. An image of the "un-rolled" label must first be generated by defining it as a texture map in texture space. Next, the form of the can is rendered in object space. Conventionally, the cylindrical form of the can is rendered by generating a set of polygons. The geometrical form of the can is thus defined in object space. The texture map (un-rolled label) is transformed onto the three-dimensional surface representation in object space (the cylindrical form), and then is projected into image space (the output display screen). The color and intensity of each picture element (pixel) in the display is accordingly a function of the transformation of the texture map into object space and the mapping from object space into image space.

Because the basis of incorporating information from a texture map to three dimensional surfaces is a mapping operation, texture mapping involves a transformation from one coordinate system to another. In particular, these coordinate systems can be referred to as texture space, object space, and image space. Typically, the texture map is defined in a two-dimensional coordinate system (u, v) in texture space with each (u, v) pair corresponding to a texture element (texel) value, the three-dimensional surface is defined in a three-dimensional system (x, y, z) in object space, and the output display screen is defined in a two-dimensional coordinate system (x', y') in image space. Thus, in a typical case, texture mapping transforms a texture plane (u, v) onto a three-dimensional surface, (x, y, z), and then projects the transformed texture plane into the output display screen coordinate system (x', y').

An additional technique is often used with texture mapping to avoid aliasing effects in the final image, in which the texel values represented by a texture map are pre-filtered prior to mapping. This pre-filtering is accomplished using "multum in parvo" maps (referred to hereinafter as simply mip maps), as is well-known. Generally, a mip map is a pyramidal data structure having indexed, differently-scaled pre-filtered mappings of stored texel values. The original texture map is referred to as the base texture, and the differently-scaled mappings represent versions thereof.

When using texture mapping to render an image of a three-dimensional scene, several texture maps are typically required to render all primitives corresponding to the scene. In a typical graphics system, the texture maps are managed in a one-dimensionally addressed texture buffer. Thus, in order to access texels in a map from the texture buffer during mapping, it is necessary to calculate a linear address using the texture coordinates corresponding to the map. Because the sizes of the texture maps vary, this address calculation typically requires both a variable multiplication (or the shifting of a variable number of address bits) and an addition.

In contrast, a two-dimensional addressing scheme would require only a shifting of a fixed number of bits and a concatenation, both of which can be hard-wired into the system and are thus significantly faster. Therefore, it would be advantageous to be able to simultaneously store and manage texture maps in the texture buffer. However, managing maps of odd shapes and sizes in the texture buffer simultaneously is difficult because a two-dimensional space allocation problem (which is somewhat like a "jigsaw puzzle") must be solved to store them. This difficulty is only increased when mip maps are stored along with their corresponding base textures.

Thus, there is a need for a computer graphics system with an improved management system for simultaneously storing texture maps of different shapes and sizes that are addressed two-dimensionally.

SUMMARY OF THE INVENTION

These needs are satisfied, the limitations of the prior art overcome, and other benefits realized in accordance with the principles of the present invention by a computer graphics system that simultaneously stores and manages graphical storage areas of variable size in a two-dimensionally addressed graphics memory. The storage areas contain data corresponding to two-dimensional graphical images such as, for example, texture maps, mip maps, bit maps, or fonts.

The graphics system manages the storage areas within the graphics memory using a quadtree that indicates the current storage state thereof. Using the quadtree, a memory manager divides the graphics memory address space into a first level (i.e. a generation) of quadrants of equal two-dimensional size. The size of storage area to be placed into the memory is compared with the size of the first level quadrants. If size is equal, then the storage area is placed into one of the quadrants. Otherwise, the memory manager further subdivides the graphics memory into quadrants on one or more descending levels (i.e. later generations) as necessary to store the storage area within.

The quadtree used by the memory manager to subdivide the graphics memory is a hierarchical data structure having a plurality of nodes arranged on levels of descending rank, with each level corresponding to a level of quadrants within the graphics memory. The quadtree nodes are arranged in hierarchical groups of four child nodes, and each child node in a group corresponds one-to-one to the four quadrants in a subdivision of the graphics memory. Each node has an allocation attribute indicating the storage status (e.g. free, partially-allocated, or full) of its corresponding quadrant. Also, each descending level of the quadtree corresponds to an ever smaller subdivision of the memory with the area of each quadrant being one-fourth that of a quadrant on a next higher level.

In general, the memory manager places a storage area within the graphics memory by subdividing the graphics memory and then traversing the quadtree to locate free quadrants for placement of the storage area. The storage state of the graphics memory is stored in the quadtree because the memory manager updates the allocation attributes of the nodes within the quadtree following an action affecting the memory contents. When placing a storage area into the memory, the memory manager subdivides the memory into quadrants of ever decreasing size until a quadrant size is reached that corresponds to the area to be stored and traverses these quadrants based upon a pre-defined ordering preference.

During the subdivision of the graphics memory, the manager consecutively traverses nodes in the quadtree until a storage quadrant of a size appropriate for the current storage area is found. For any given node traversed, if the quadtree state indicates that the storage area will not fit within the memory at the current location (e.g. because a base texture has mip maps that extend into a quadrant that is already filled), then the manager traverses the quadtree to another node. Otherwise, the manager places the storage area within the quadrant corresponding to the current node.

In a preferred approach according to the present invention, the storage areas are texture maps along with any associated mip maps, which may be either square or rectangular. The graphics memory is a texture buffer that is managed by a texture manager, and the nodes in the quadtree are traversed in an order that is dependent upon the type of mip map, if any, associated with the texture map to be stored.

An advantage of the present invention is the capability to address texture maps using a two-dimensional addressing scheme (e.g. as in twodimensional display tiling schemes). Another advantage is the capability to simultaneously store two-dimensional texture maps both with and without any corresponding mip maps. In contrast to the present invention, existing display tiling mechanisms do not permit such simultaneous storage.

The foregoing and other objects, features, and advantages of the invention will be apparent from the following more particular description of a preferred embodiment of the invention, as illustrated in the accompanying drawings.

BRIEF DESCRIPTION OF THE DRAWINGS

FIGS. 7–29 illustrate the storage according to the present invention of square texture maps and their associated mip maps within a two-dimensional texture buffer and the corresponding memory state representations in the quadtree.

BEST MODE FOR CARRYING OUT THE INVENTION

Figure 1:
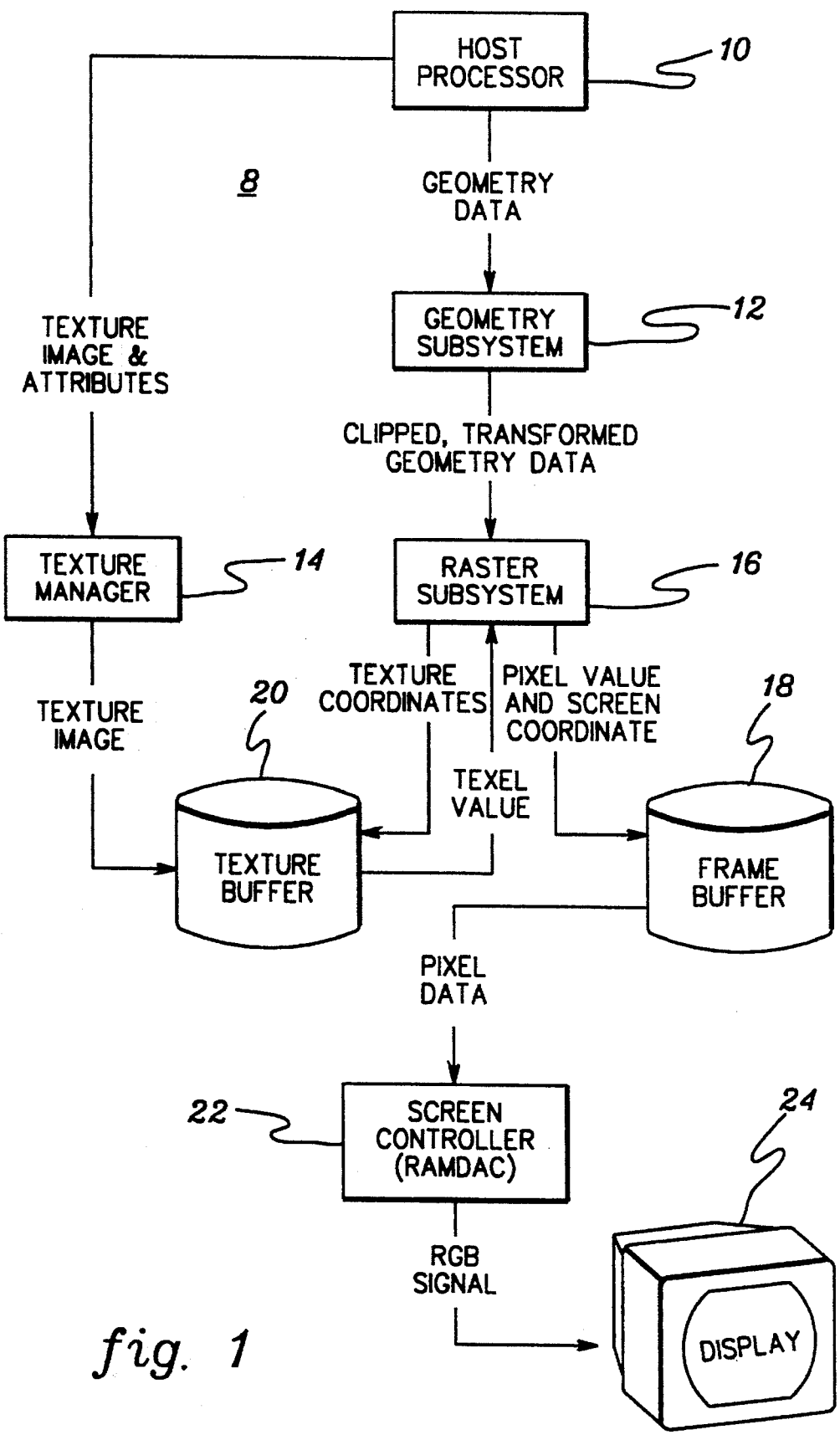
FIG. 1 is a block diagram of a computer graphics systemiccording to the present invention.

FIG. 1 is a block diagram of a computer graphics system 8 according to the present invention. A host processor 10 provides geometry data to a geometry subsystem 12 and also provides texture image and attribute data to a texture manager 14. Geometry subsystem 12 processes the geometry data from host processor 10 and provides clipped, transformed geometry data to a raster subsystem 16.

Texture manager 14 stores the texture image data, which corresponds to texture maps and their mip maps, into a texture buffer 20 having a size sufficient to store the largest texture map provided by texture manager 14. For example, texture buffer 20 may have a size of say 256×256 8-bit integers or 128×128 32-bit integers. In the preferred embodiment, texture buffer 20 is square and each linear dimension thereof is a power of 2 (e.g. 2, 4, 8, 16, 32, ...). However, in other embodiments, texture buffer 20 could have a shape that results from the sum of any number of contiguous, square memory blocks, each of whose linear dimension is a power of two. The quadtree data structure, which describes this texture buffer and is discussed in greater detail below, is implemented as a linked list in the texture manager's local memory.

Raster subsystem 16 processes both the object geometry data from geometry subsystem 12 and the texture coordinates, which are either received directly from geometry subsystem 12 or derived from the geometry data. Next, raster subsystem 16 provides the texture coordinates to texture buffer 20 and retrieves texel values therefrom corresponding to the texture coordinates. Raster subsystem 16 then performs any color conversion (e.g. texture mapping), normal perturbation (e.g. bump mapping), geometry operations (e.g. displacement mapping), or color blending operations (e.g. texture or alpha mapping), as required to generate pixel values for each pixel of the object being rendered by graphics system 8. These pixel values comprise, for example, color intensities for the colors of red, green, and blue.

The pixel values calculated by raster subsystem 16 are stored into frame buffer 18. The pixel data represented by the stored pixel values within frame buffer 18 is provided to a screen controller 22, which is, for example, a RAM digital-to-analog converter (RAMDAC). Screen controller 22 provides an RGB signal which drives a display 24.

Although a specific graphics system is described herein, the scope of the present invention is not limited to such a system. Rather, there are many graphics systems that may embody the present invention. For example, the present invention may also be embodied in a system that performs rendering strictly in software, with the texture buffer representing a two-dimensional array in the host processor's local memory.

Figure 2:
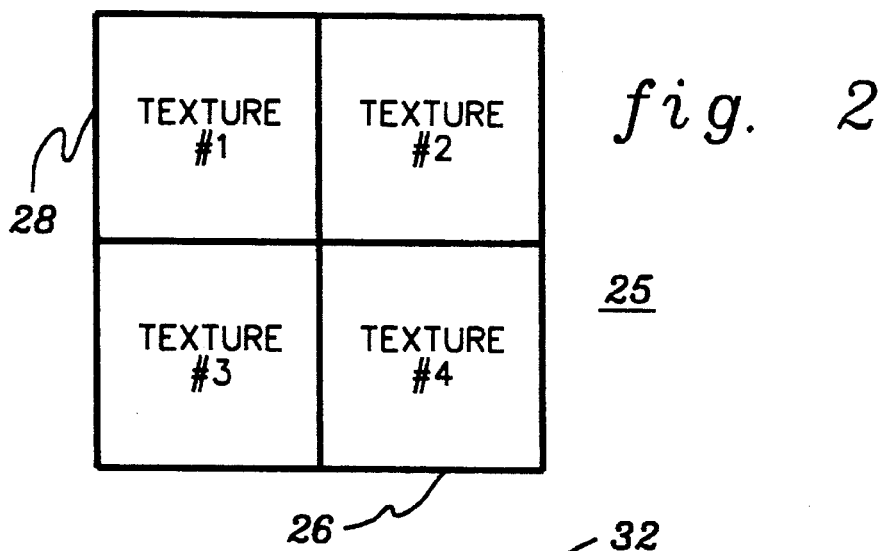
FIGS. 2–4 are two-dimensional representations of texture buffer address spaces illustrating the storage of texture maps and mip maps of different types there.
Figure 3:
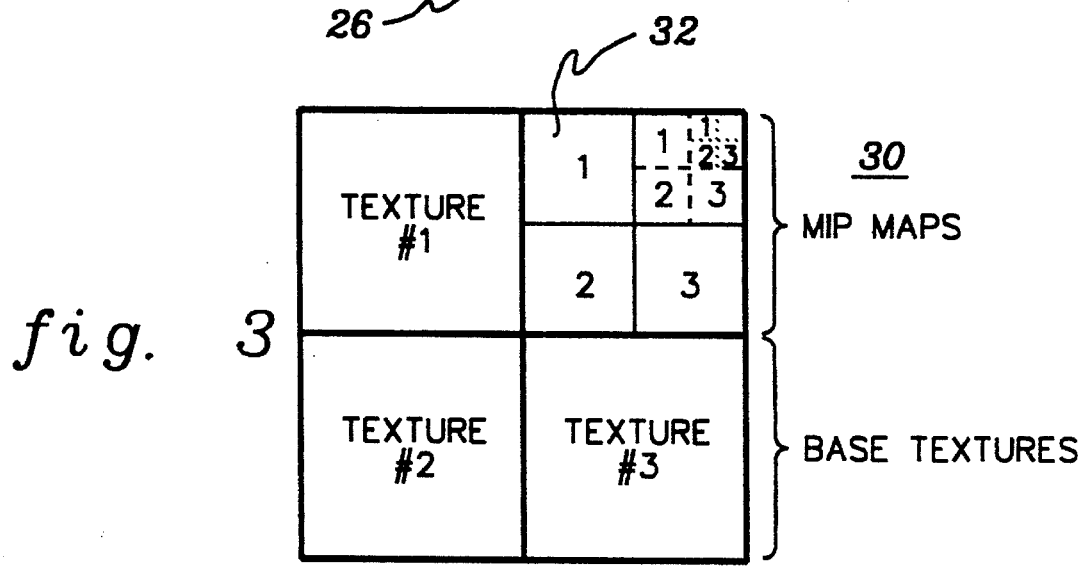
Figure 4:
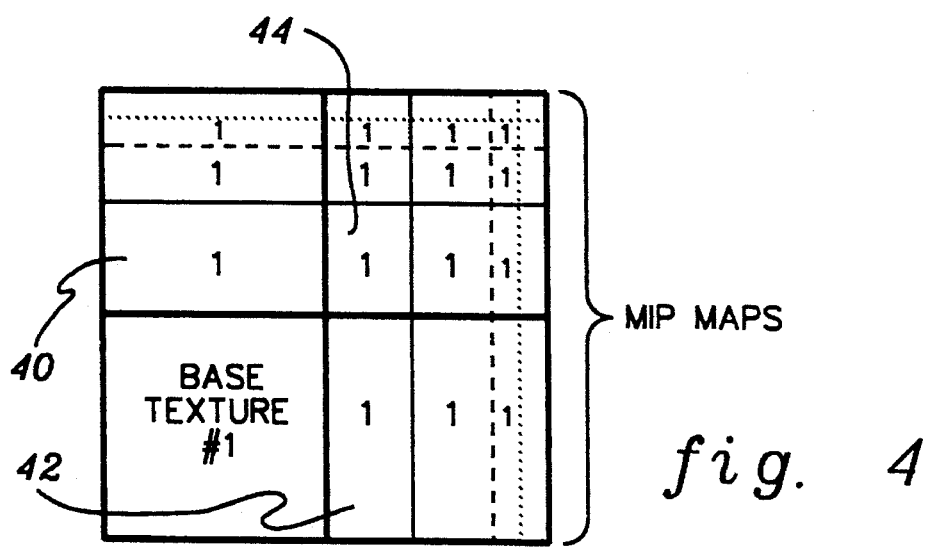

FIGS. 2–4 are two-dimensional representations of texture buffer address spaces illustrating the storage of texture maps and mip maps of different types therein. More specifically, FIG. 2 illustrates the simultaneous storage of four plain texture maps (or simply textures) within a texture buffer 25. These textures are described as plain because there are no mip maps associated therewith. Texture buffer 25 is shown divided into a first level of quadrants with a plain texture stored within each quadrant. Each quadrant is of identical two-dimensional size. The texel values corresponding to a texture are addressed within texture buffer 25 using two-dimensional texture coordinates. The horizontal side 26 of texture buffer 25 corresponds, for example, to the first texture coordinate, and the vertical side 28 thereof corresponds, for example, to the second texture coordinate.

As discussed above, the size of the texture buffer can vary widely. However, for simplicity of description, the texture buffer will be described below as having a size of 128 by 128 bytes. Thus, in FIG. 2, textures #1–4 each have a size of 64 by 64 bytes.

Each texture is stored so that the texel values corresponding thereto are arranged two-dimensionally within the texture buffer in a manner corresponding to the two-dimensional image from which the texture was formed. Thus, for example, texture #3 occupies the one-dimensional addresses 0-63, 128-191, 256-319, and so forth, through addresses 8064-8127; while texture #4 occupies the one-dimensional addresses 64-127,192-255, etc., through addresses 8128-8191. Similarly, textures #1 and #2 interleave within one-dimensional addresses 8192-16383. The phrase "two-dimensional", as used herein to describe texture maps and buffers also includes the special case where the map or buffer has one dimension of size equal to one.

FIG. 3 illustrates a texture buffer concurrently storing three base textures, each of which has "square" mip maps 30 associated therewith and stored in one quadrant of the buffer. The mip maps for base texture #1 are indicated by a "1" and likewise for textures #2 and 3. As is known, the two-dimensional size of square mip maps continuously decreases by a factor of four for each mip map in a series thereof. Thus, the first mip map 32 for base texture #1 has a vertical dimension and a horizontal dimension which are both half that of the base texture. For a texture buffer of size 128×128 bytes, texture #1 has a size of 64×64 bytes, and first mip map 32 has a size of 32×32 bytes.

It should be noted that the mip maps for texture 1 are stored with a horizontal orientation in the texture buffer, the mip maps for texture #2 are stored with a diagonal orientation, and the mip maps for texture #3 are stored with a vertical orientation. The choice of storage orientation for square mip maps is selected depending upon the quadrant in which the base texture is placed and is discussed in greater detail later.

FIG. 4 illustrates a texture buffer that simultaneously stores a base texture #1 along with its associated "rectangular" mip maps. For a series of rectangular mip maps, each mip map in the series has one dimension that is constant and equal to that of the preceding texture and another dimension that is half that of the preceding texture. Thus, if base texture #1 has a size of 64×64, then mip map 40 has a size of 64×32, mip map 44 has a size of 32×32, and mip map 42 has a size of 32×64. Whereas square mip maps for three base textures are stored in one quadrant as shown in FIG. 3, rectangular mip maps for one base texture are stored in three adjoining quadrants as shown in FIG. 4. Also, it should be noted that a base texture along with its rectangular mip maps occupies a storage space equal to just less than four times the size of the base texture. Specifically, a base texture of size MxN would require a total storage space equal to $(2M-1) \times (2N-1)$.

Figure 5:
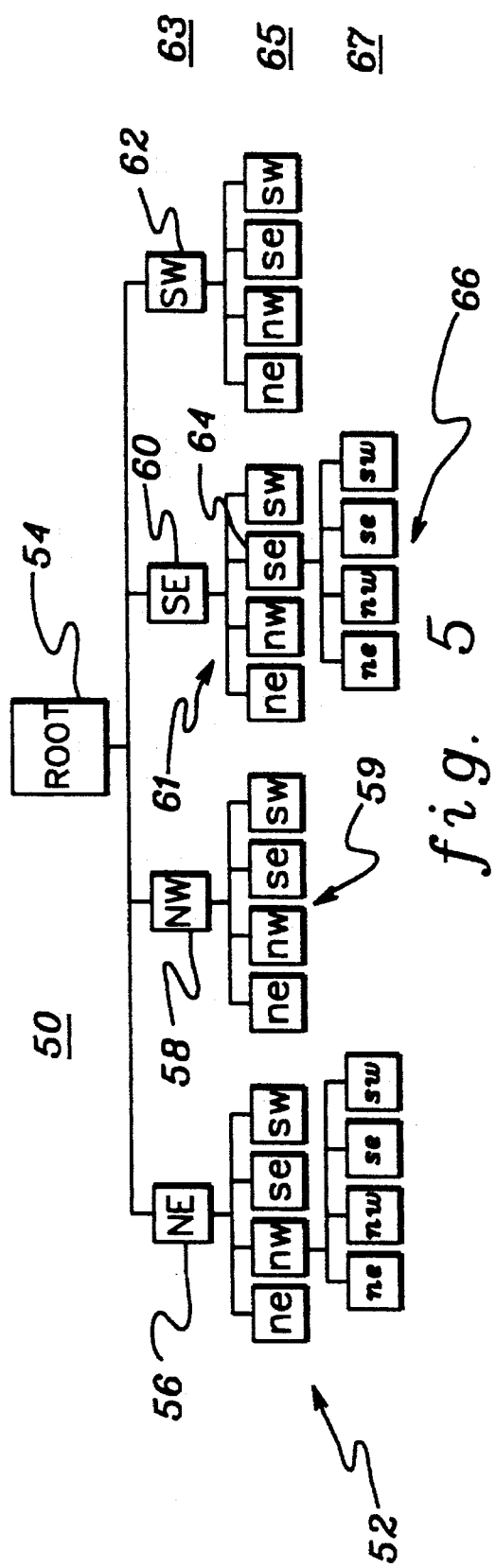
FIG. 5 illustrates a quadtree data structure having child nodes clustered in groups of four.

FIG. 5 illustrates a quadtree data structure 50 having child nodes 52 organized in groups of four. A quadtree data structure itself is known in the art, and is implemented in the preferred embodiment of the present invention by a multiply-linked list. Each quadtree node structure in the list contains memory allocation information, along with four node pointers which represent the four child quadrants. An alternate implementation may use a large array of node structures and an appropriate indexing scheme in lieu of the linked list.

Texture manager 14 uses information stored within quadtree 50 to manage the subdivision of the address space for texture buffer 20 into a plurality of levels of ever smaller quadrants as required to store the texture maps provided from host processor 10. More specifically, quadtree 50 has a root node 54 which has four child nodes 56, 58, 60, and 62 located on a first level 63. These child nodes are in turn parent nodes with respect to the next lower level 65. Thus, node 60 is a parent node having four child nodes 61. Similarly, node 64 is a parent node with respect to a group of child nodes 66 on the next lower level 67.

Also, each child in a group of four nodes in the quadtree has a directional attribute corresponding to one of four orthogonal directions within the two-dimensional address space of the texture buffer, as will be discussed in greater detail later. The directional attributes shown in FIG. 5 are northeast (NE or ne), northwest (NW or nw), southeast (SE or se), or southwest (SW or sw). The same four directional attributes are used throughout the quadtree, and each attribute corresponds to a relative two-dimensional direction in the texture buffer that is constant throughout all levels of the quadtree.

In the preferred embodiment, the quadtree is implemented as a dynamic structure in which node structures are allocated as required per the size of the texture. For example, with a 128×128 texture buffer, the first level of subdivision is not required unless a texture that is 64×64 or smaller is to be stored. Similarly, the second level is not required unless the texture is 32×32 or smaller. This pattern may repeat down to some minimum quadrant size.

However, in another embodiment, the quadtree could have a static size dictated by design choices and the texture buffer size limitations for the particular graphics system to be built. For example, one of these choices is the minimum quadrant size that will be used in the texture buffer. The quadtree in FIG. 5 depicts the preferred embodiment, with a dynamically allocated linked list structure, which indicates subdivision in only two of the 16 quadrants located on the second level (i.e., level 65). In contrast, if the quadtree were implemented with a static size, then there would be 4 child nodes at each of these 16 quadrants, for a total of 64 nodes on the third level (i.e., level 67).

Figure 6:
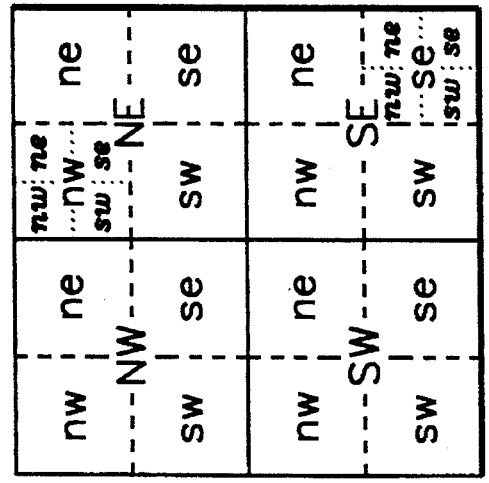
FIG. 6 is a representation of a two-dimensional texture buffer subdivided into quadrants corresponding to the quadtree of FIG. 5.

FIG. 6 illustrates the subdivision of the address space of texture buffer 20 into quadrants corresponding to the quadtree of FIG. 5. The two-dimensional address space of buffer 20 is subdivided into a first level of quadrants indicated by "NW", "NE", "SW" and "SE". The first level of the address space corresponds to the first level 63 of quadtree 50, and each of nodes 56, 58, 60, and 62 correspond one-to-one with the quadrants having the same directional attribute.

Each of the first level quadrants is shown further subdivided into groups of four quadrants on a next lower level with each lower-level quadrant having horizontal and vertical dimensions that are half that of the parent quadrant. For example, the "NW" quadrant is a parent quadrant that is divided into child quadrants 70 indicated by "nw", "ne", "sw" and "se" that correspond to nodes 59 of level 65 in quadtree 50. Each node on level 65 corresponds one-to-one with a quadrant in the texture buffer.

The texture buffer is further subdivided into lower levels as necessary to locate an empty quadrant of the appropriate size. For example, the first level quadrant "SE" is shown divided into four quadrants corresponding to the group of four child nodes 61 in quadtree 50. Node 64 of this group corresponds to a quadrant 72 indicated by "se" in FIG. 6. Quadrant 72 is further shown subdivided into four quadrants corresponding to the group of child nodes 66 in quadtree 50.

The nodes in quadtree 50 each correspond one-toone with a quadrant within texture buffer 20, and texture manager 14 uses these nodes to traverse the address space of the texture buffer and access an appropriate quadrant for storing a texture map. For purposes of description, each node will be described as having a pointer that points to a quadrant in the texture buffer. However, it is not necessary for the present invention that the quadtree be implemented using such pointers. Those skilled in the art are familiar with implementations of linked lists and quadtrees, which use arrays of fixed size and implicit "links" and "pointers" as can be used with the present invention.

Each node also has a block free flag which indicates the storage status of the quadrant pointed to by that node. This block free flag may be set to, for example, full, partially-allocated, or free. If it is set to full, then the quadrant is filled by a single texture map and, thus, has no available storage space. If it is set to free, then no data is stored within the quadrant at the same or any descending levels. If it is set to partially-allocated, then at least one texture map or mip map of a size less than the quadrant corresponding to the node is stored in a quadrant on a descending level (thus, the quadrant may not be completely full). The partially-allocated designation (rather than a full designation) may remain assigned to such a node, even after all quadrants on descending levels become filled, in order to distinguish between being full-with-a-single-texture and full-with-multiple-textures during garbage collection.

When the block free flag is set to partially-allocated and square mip maps are stored within that quadrant, the node pointing to that quadrant has an additional orientation attribute associated therewith to indicate whether the mip maps are stored with horizontal, diagonal, and/or vertical orientations. This orientation information provides the memory manager full knowledge of the structures below a given node, without further subdivision. Specifically, horizontal organization implies the allocation (full designation) of the northwest quadrant of each successive northeast child node; diagonal organization implies the allocation of the northeast quadrant of each northeast child; and vertical organization implies the allocation of the southeast quadrant of each northeast child.

In addition, in the preferred embodiment the texture manager traverses the nodes of the quadtree following a pre-determined ordering of NW, SE, SW, and NE for plain textures and SE, SW, and NW for base textures having square mip maps. The ordering for plain textures is also followed for base textures having square mip maps until the texture manager is traversing a level of the quadtree with quadrants having a size equal to that of the base texture. This is discussed in greater detail later.

The NE direction is both last in the order for plain textures and excluded from the order for base textures because a NE quadrant is always used for storing square mip maps. These limitations are intended to minimize storage allocation conflicts within the texture buffer between plain textures and square mip maps. Although a particular ordering is described herein, the ordering used is arbitrary and may be different for other embodiments.

Memory Allocation Examples

FIGS. 7–29 illustrate the storage according to the present invention of square texture maps and their associated mip maps within a two-dimensionally addressed texture buffer and the corresponding memory state representations in the quadtree. For purposes of description, the operation of the texture manager is first described using several specific examples of the storage and removal of textures and mip maps within the texture buffer. Later, the operation of the texture manager is described in detail using logic flow diagrams with references back to the specific examples of FIGS. 7–29 where necessary. The quadtrees shown for the operations illustrated in FIGS. 7–29 are limited to two levels (i.e. two generations) for the sake of simplicity. The present invention, however, can be used with quadtrees having more than two levels (or generations) of parent and child nodes. In addition, it should be noted that FIGS. 7–29 are intended to constitute a continuous series of before and after figures in order to illustrate changes in the states of the texture buffer and quadtree due to the operations described below.

In the initial embodiment the texture maps stored in the texture buffer are all square and have byte dimensions that are powers of two. In other words, the size of each texture map can be designated as $2^N \times 2^N$. Likewise, the texture buffer size is a power of two. Thus, any texture having a size less than or equal to that of the texture buffer will fit into a quadrant therein. Further, any set of mip maps created from such a texture will also be square and fit within quadrants of varying size within the texture buffer. However, as shown in a later section, texture maps that are not square may also be stored.

Figures 7, 8:
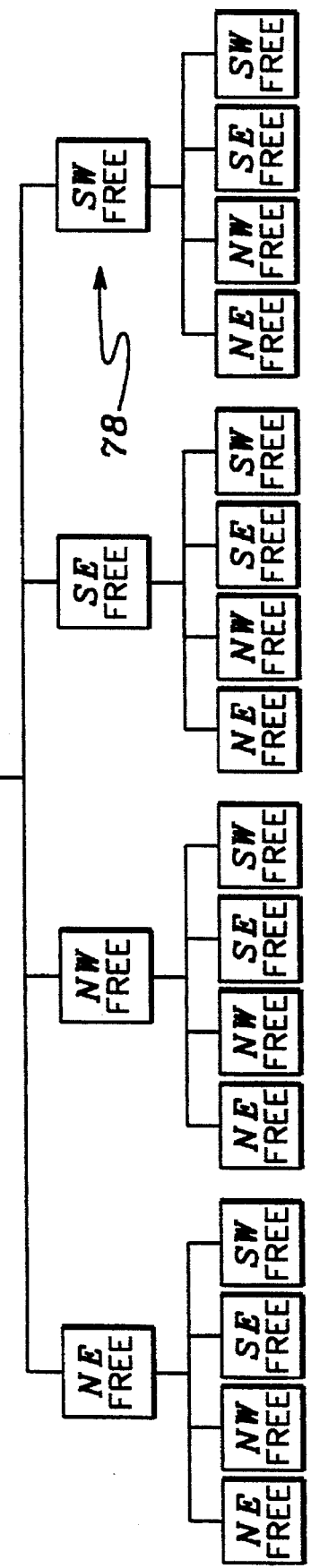

FIG. 7 indicates the initial state of a texture buffer 74 in which no texture maps are stored, and FIG. 8 illustrates the state of a quadtree 76 corresponding to texture buffer 74. All block free flags 78 for all nodes of quadtree 76 are set to "FREE" because no texture maps are stored. As discussed above, texture buffer 74 is assumed to have a size of 128×128 bytes for purposes of description in FIGS. 7–29.

Figure 10:
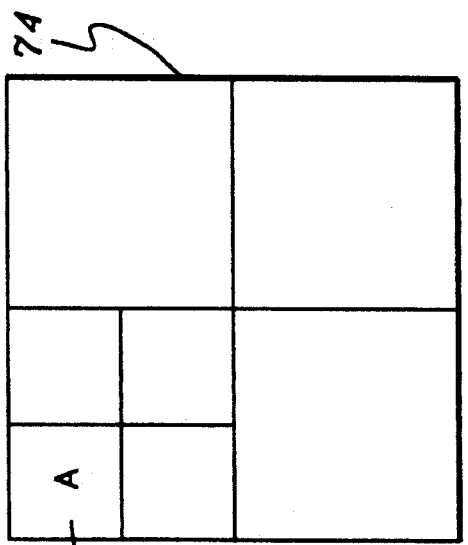
Figure 9:
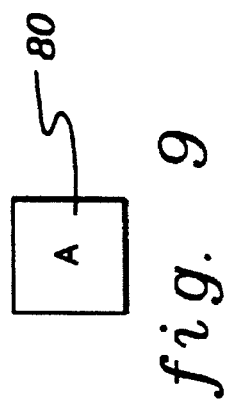
Figure 11:
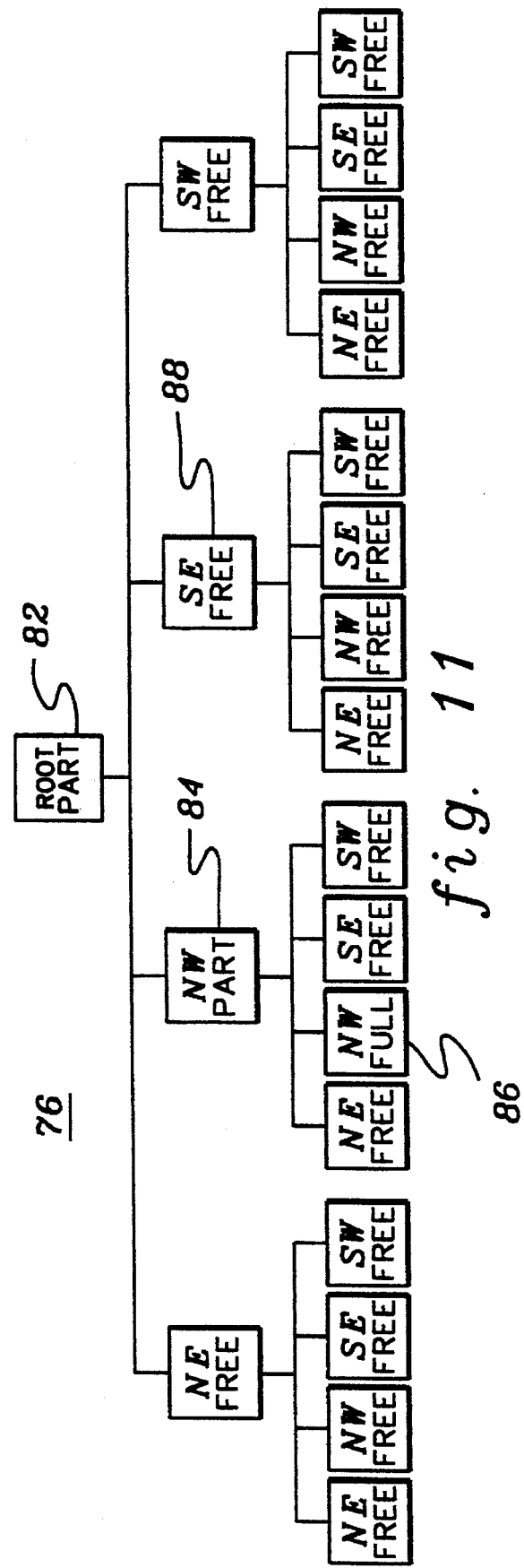

FIGS. 9–11 illustrate a plain texture 80 of size 32×32 to be stored in texture buffer 74 and the state of quadtree 76 following the storage thereof. The texture manager begins searching on root node 82 of quadtree 76 and first compares the size of texture 80 (32×32) with the size of texture buffer 74 (128×128). Because texture 80 is smaller, the texture manager traverses the quadtree to NW node 84 according to the pre-defined order preference for plain textures discussed earlier. Node 84 is on a level of the quadtree which corresponds to a subdivision into quadrants each having a size of 64×64. The texture manager again compares the size of texture 80 with buffer 74. Because texture 80 is smaller, the texture manager again traverses the quadtree to the NW node 86 according to the preference ordering. Node 86 is on a level corresponding to a subdivision into quadrants each having a size of 32×32.

The texture manager compares the size of texture 80 with the size of the quadrant corresponding to node 86. Because they are equal and the block free flag for that quadrant is set to FREE, the texture manager writes the data corresponding to texture 80 into the quadrant corresponding to node 86. The block free flag for node 86 is then set to full, which indicates that a single plain texture completely fills that quadrant. Also, the block free flag for node 84 is set to partially-allocated (indicated by "PART" in the figures) because at least one descendant node (here, node 86) corresponds to a quadrant containing a texture. Similarly, the block free flag for root node 82 is set to PART. It should be noted that the texture manager did not earlier traverse the quadtree to SE node 88 following node 84, even though SE is the next direction in the preference ordering, because the texture size was smaller than the quadrant size for that level, and therefore, the texture manager searched on the next lower level.

FIGS. 12–14 illustrate a base texture 90 of size 32×32 with square mip maps 92 to be stored in texture buffer 74 and the state of quadtree 76 following the storage thereof. The texture manager begins searching at root node 82 of quadtree 76 and first compares the size of texture 90 (32×32) with the size of texture buffer 74 (128×128). Because texture 90 is smaller, the texture manager traverses to NW node 84. Because texture 90 is smaller than the quadrant size of 64×64 (i.e. the size for the first level of subdivision), the texture manager traverses to NW node 86.

The size of texture 90 is compared with the quadrant size for the second level (32×32). Because they are equal, the texture manager will attempt to place the texture on the second level. Also, because texture 90 is a base texture having square mip maps, the texture manager will traverse the second level using the pre-defined preference ordering for base textures of SE, SW, and NW. Thus, the texture manager traverses to SE node 94. Because the SE quadrant is FREE (and because the base texture 90 will fit therein), the texture manager next determines whether mip maps 92 will fit within the sibling NE quadrant 96.

In the preferred embodiment, square mip maps for a base texture are always stored in a NE quadrant with one of three orientations: vertical, diagonal, or horizontal. A base texture stored in the SE quadrant always has its mip maps stored with a vertical orientation, a base texture stored in the SW quadrant always has its mip maps stored with a diagonal orientation, and a base texture stored in the NW quadrant always has its mip maps stored with a horizontal orientation. However, in other embodiments mip maps could be stored in any sequence of adjacent memory blocks.

Thus, in FIG. 13, because base texture 90 will fit within the SE quadrant, the texture manager checks the status of the NE quadrant 98. The block free flag for quadrant 98 is FREE. Therefore, the texture manager places texture 90 into the SE quadrant, places mip maps 92 into the NE quadrant 98 with a vertical orientation, sets the block free flag for the SE quadrant 94 to FULL, and sets the block free flag for NE quadrant 96 to PART. In addition, because texture 90 is stored with square mip maps, nodes 84 and 96 store an orientation attribute indicating the type of square mip map stored as being vertical.

Figure 16:
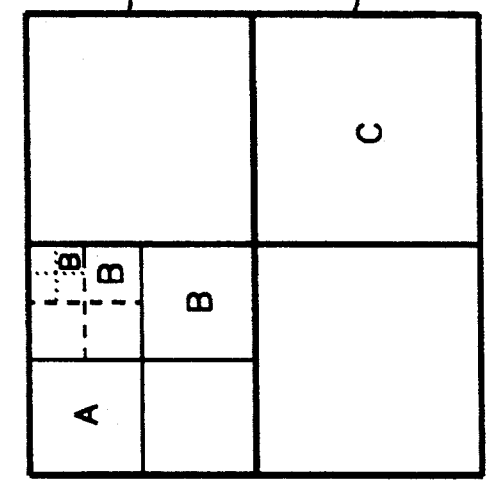
Figure 15:
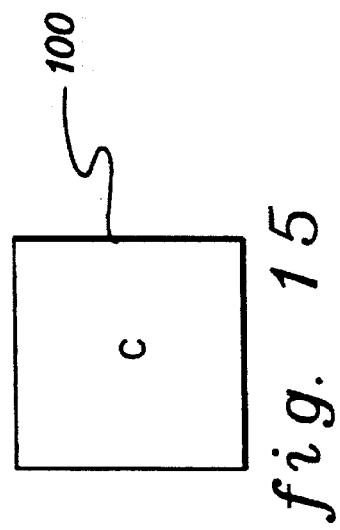
Figure 17:
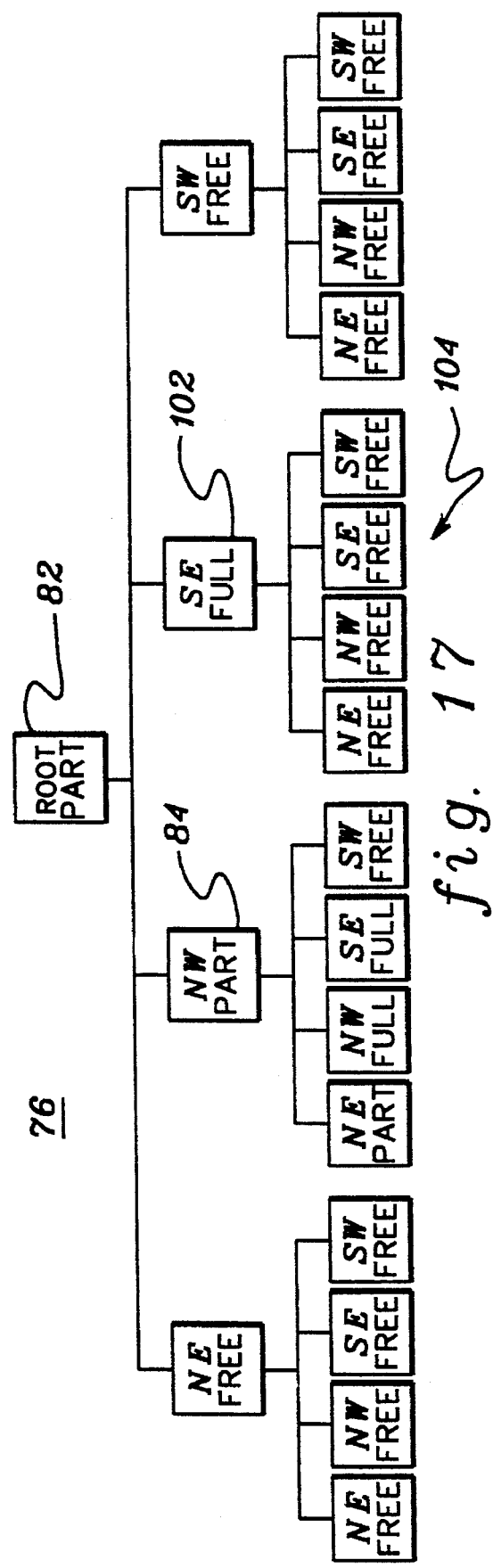

FIGS. 15–17 illustrate a plain texture 100 of size 64×64 to be stored in texture buffer 74 and the state of quadtree 76 following the storage thereof. The texture manager begins searching at root node 82 of quadtree 76 and first compares the size of texture 100 (64×64) with the size of texture buffer 74 (128×128). This comparison fails, and the texture manager traverses to NW node 84. The size comparison for this level passes, but the block free flag for the NW quadrant is PART. Thus, texture 100 will not fit here, and the texture manager traverses to SE node 102, which has a block free flag set to FREE (recall that FIG. 14 shows the state of node 102 prior to storing texture 100). Texture 100 is placed into the quadrant corresponding to node 102, and the block free flag is set to FULL. Note that the child nodes 104 of ancestor node 102, including any other descendant nodes in other quadtree embodiments, inherit the FULL status of ancestor node 102. The block free flags for the descendants need not be changed because of this inheritance. These quadtree nodes will never be examined by the texture manager because of their parents' FULL designation.

Figure 19:
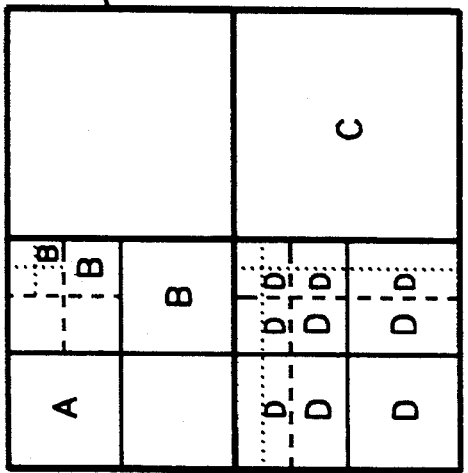
Figure 18:
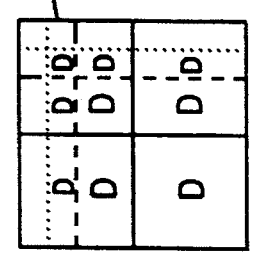
Figure 20:
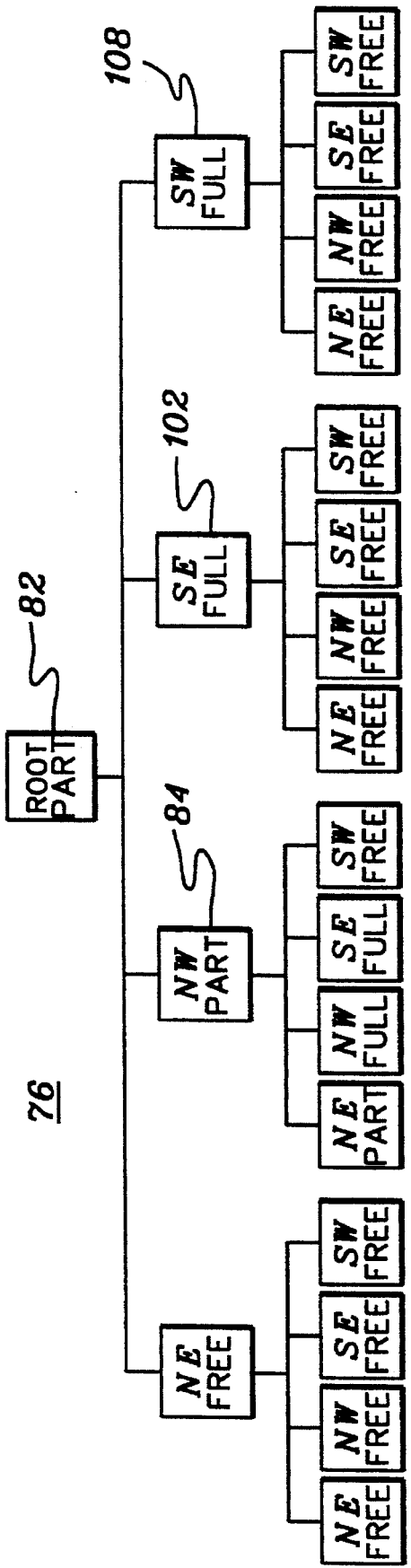

FIGS. 18–20 illustrate a base texture with rectangular mip maps 106 to be stored in texture buffer 74 and the state of quadtree 76 following the storage thereof. In the preferred embodiment, a base texture with rectangular mip maps is always stored in the SW quadrant, and the associated mip maps are always stored in the sibling NW, NE, and SE quadrants. Also, in the preferred embodiment, the texture manager handles the storage of a base texture with rectangular mip maps in substantially the same manner as it handles the storage of a plain texture of the same overall size 9 (that is, four times the overall size of the base texture). Thus, since the size of base texture 107 is 32×32, the overall size of texture 106 is 64×64 and is managed as if it were a plain texture with size 64×64.

The texture manager begins searching at root node 82 of quadtree 76 and first compares the size of texture 106 (64×64) with the size of texture buffer 74 (128×128). This comparison fails, and the texture manager traverses to NW node 84. The size comparison for this level passes, but the block free flag for the NW quadrant is PART. Thus, texture 100 will not fit here, and the texture manager traverses to SE node 102, which is set to FULL. Therefore, the texture manager traverses to SW node 108, which is set to FREE. Texture 106 is placed into the quadrant corresponding to SW node 108, and its block free flag is set to FULL.

Figure 22:
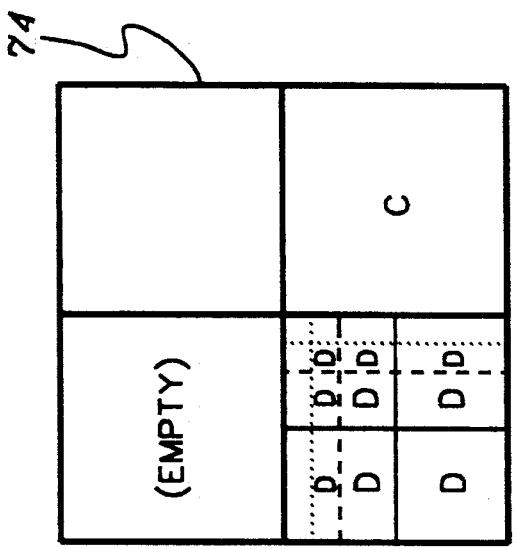
Figure 21:
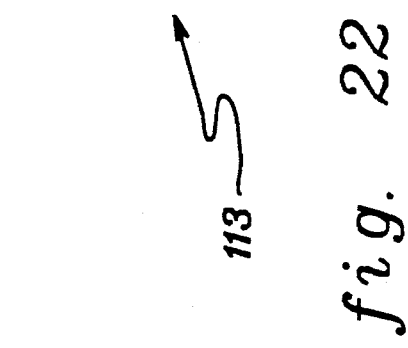
Figure 23:
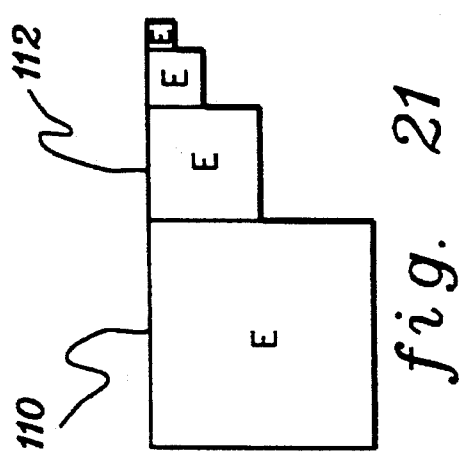
Figure 23:
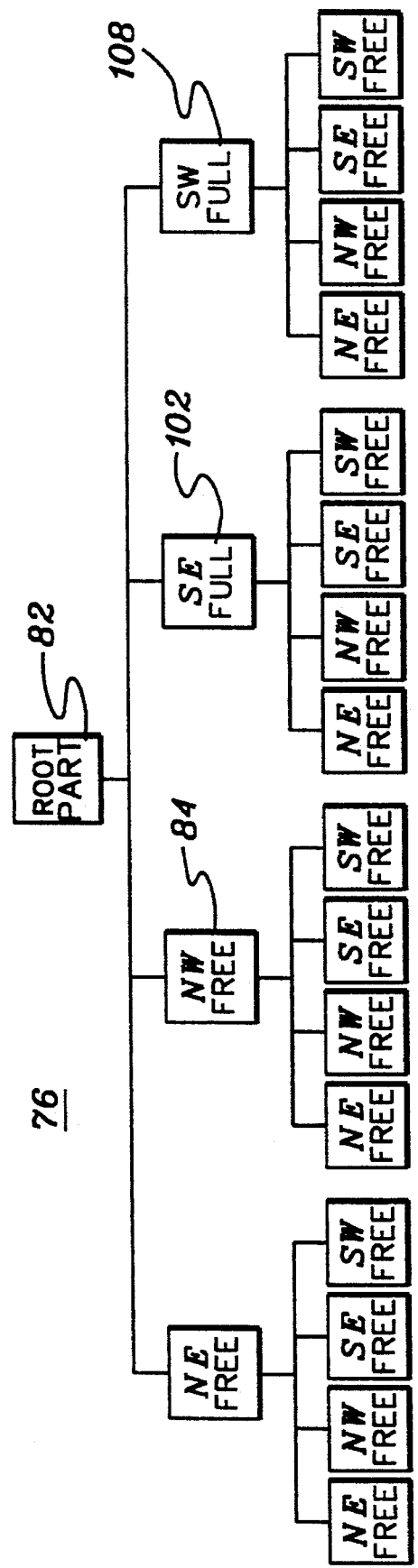

FIGS. 21–23 illustrate an attempt to store a base texture 110 of size 64×64 with square mip maps 112 into texture buffer 74 which fails and is followed by a garbage collection algorithm to clear sufficient memory space in texture buffer 74 for the storage of texture 110 and mip maps 112. FIG. 23 shows the state of quadtree 76 following this garbage collection. Similarly as described above, the texture manager traverses from node 82, where the size comparison fails, to node 84. The size comparison passes at the first level. Since texture 110 has square mip maps, the texture manager traverses first to SE node 102, which is set to FULL, then to SW node 108, which is also set to FULL, and finally back to NW node 84. Because node 84 is set to PART, base texture 110 will not fit, and the texture manager has exhausted all storage possibilities (recall that the NE quadrant is not used to store a base texture with mip maps). Therefore, a garbage collection algorithm is initiated to remove some of the previously stored textures from texture buffer 74.

The particular garbage collection algorithm used can vary, as will be recognized by one skilled in the art. For example, the algorithm may implement a FIFO or LIFO collection approach, may remove textures based upon their size, or upon the length of time since their last usage. Also, in other embodiments the stored textures could be rearranged to make room for a new texture. Garbage collection is terminated when there is sufficient room to insert the current texture in the texture buffer. In FIG. 22, previous textures 80 and 90 along with mip maps 92 (indicated by "A" and "B") are shown removed 113 as a result of FIFO garbage collection. In quadtree 76 the block free flags for NW node 84 and all of its descendants are set to FREE.

Figure 25:
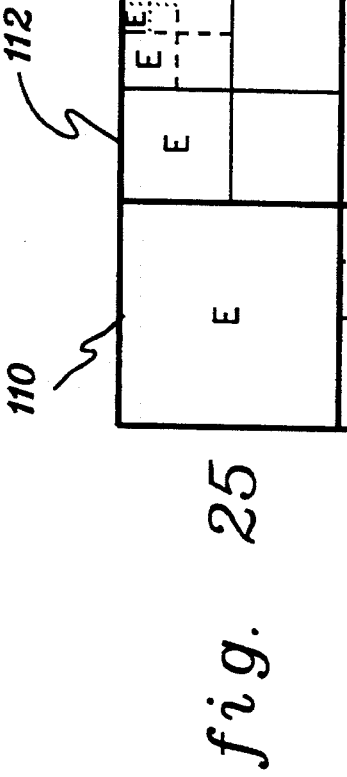
Figure 24:
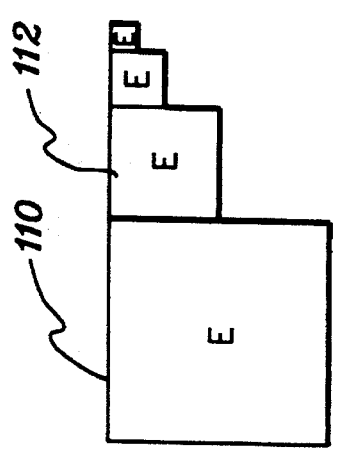
Figure 26:
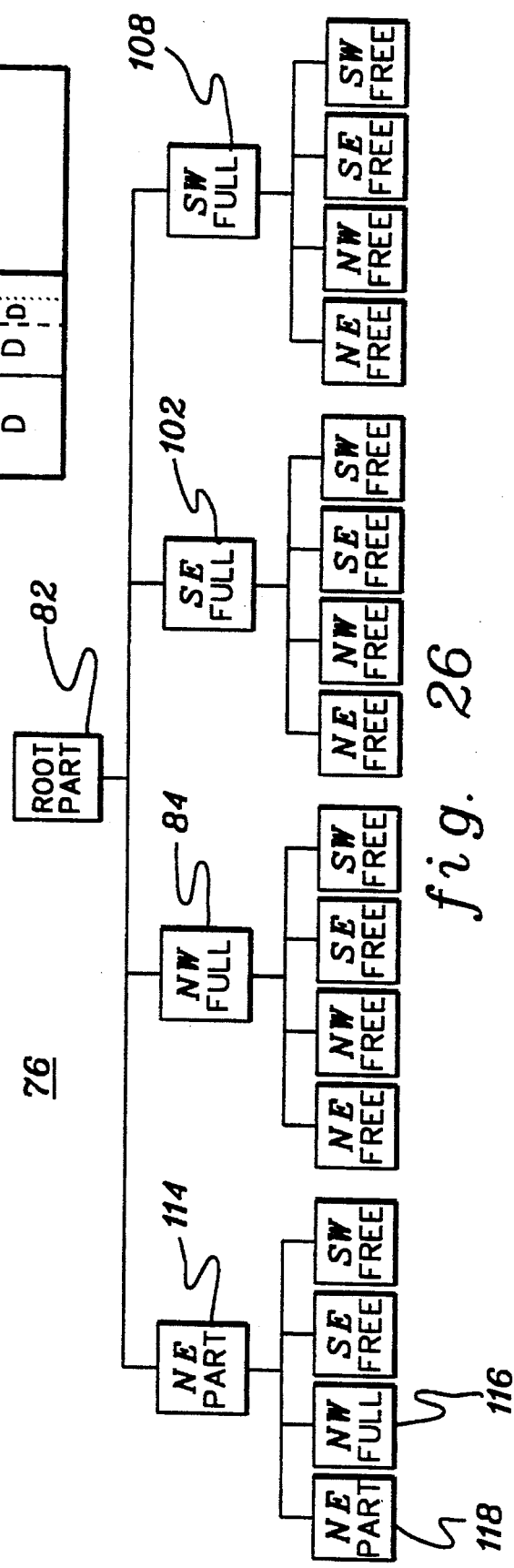

FIGS. 24–26 illustrate the insertion of texture 110 and mip maps 112 following garbage collection above and the state of texture buffer 74 and quadtree 76 following this insertion. The texture manager traverses nodes 82, 84, 102, 108, and then 84 again as described above. Because node 84 now is set to FREE, the texture manager checks the status of NE node 114, which is also FREE, to determine if mip maps 112 will fit. As a result, texture 110 is placed into the NW quadrant, and mip maps 112 are placed into the sibling NE quadrant with a horizontal orientation. The block free flag for node 84 is set to FULL. Node 116 is also set to FULL, and nodes 118 and 114 are set to PART. In addition, nodes 82, 114, and 118 have an orientation attribute set indicating that horizontal mip maps are stored therein.

Figure 28:
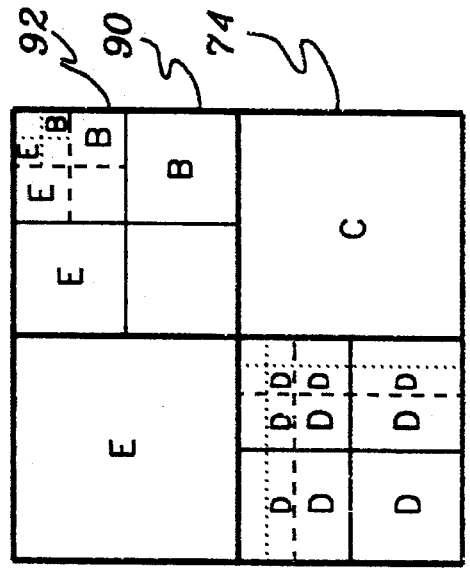
Figure 27:
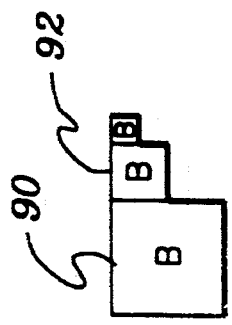
Figure 29:
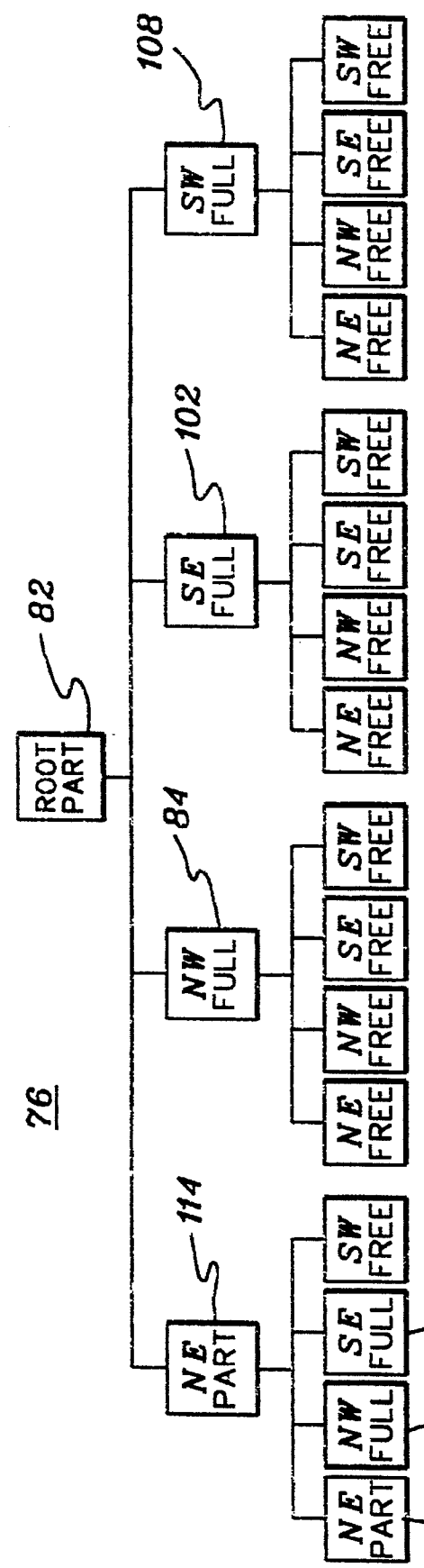

FIGS. 27–29 illustrate the re-insertion of base texture 90 and mip maps 92 back into texture buffer 74 and the state of quadtree 76 following their insertion. The texture manager first traverses nodes 82 and 84 which are designated as FULL, so the texture manager fails to place texture 90 in the first-level NW quadrant. Next, the texture manager traverses SE node 102 and SW node 108. These quadrants are also FULL, so the texture manager traverses to NE node 114. NE node 114 corresponds to the last direction in the predefined preference ordering for plain textures of NW, SE, SW, and NE. Texture 90 is not a plain texture, but in the preferred embodiment, the plain texture ordering is always followed until the size comparison test is passed.

From node 114, the texture manager traverses to node 116. Because the size comparison test is passed at this node, the texture manager traverses to SE node 120, which has its block free flag set to FREE. Also, the NE node 118 has its block free flag set to PART and has an orientation attribute indicating that only horizontal mip maps are stored in its quadrant. Thus, texture 90 is stored in the SE quadrant and mip maps 92 are stored with a vertical orientation in the NE quadrant. The block free flag for node 120 is set to FULL, and nodes 114 and 118 have their orientation attribute set to indicate that square mip maps are stored with both horizontal and vertical orientations.

Memory Allocation Algorithm Details

Figure 30:
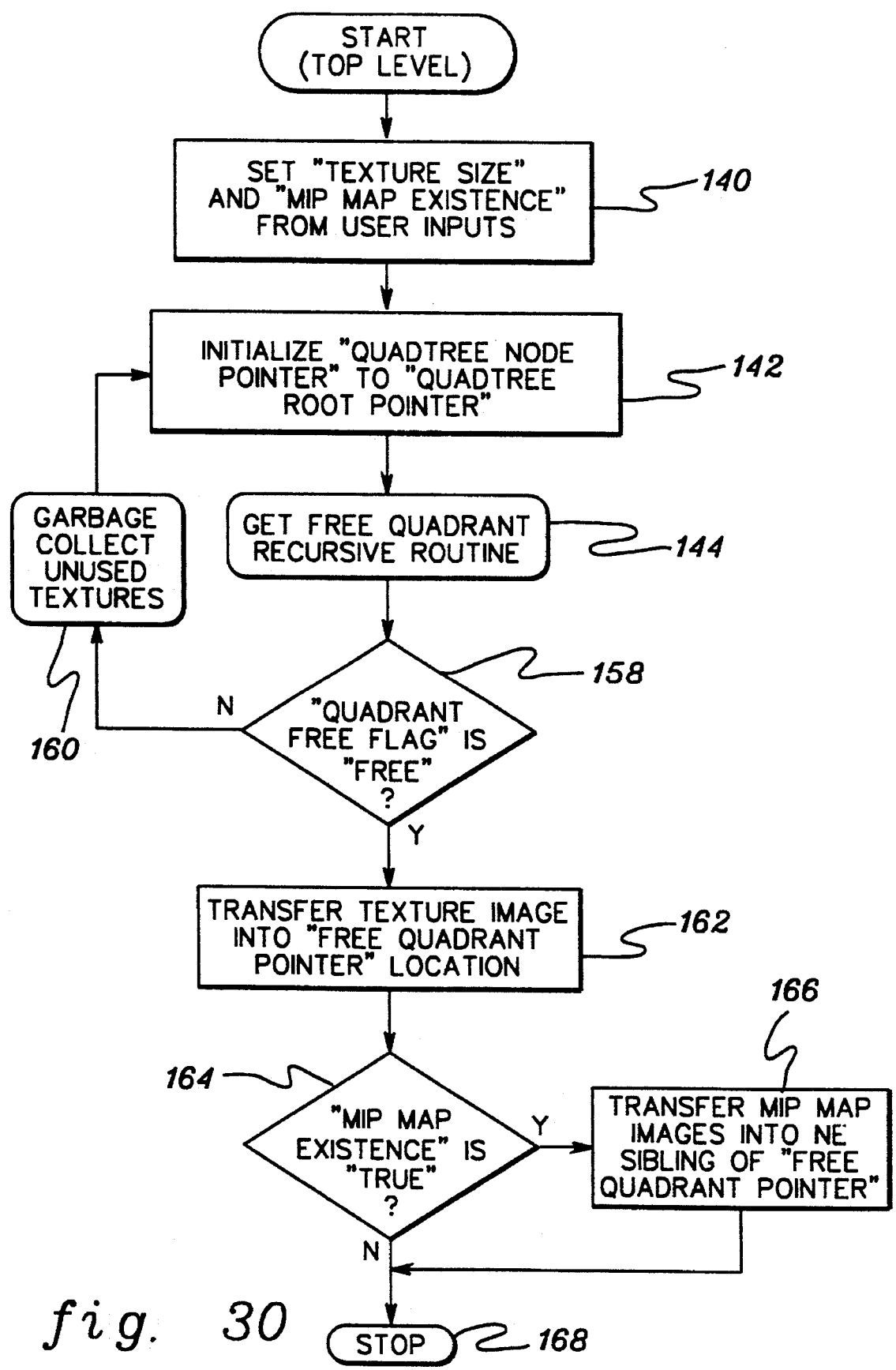
FIGS. 30–32 are logic flow diagrams illustrating the operation of a graphics memory manager according to a preferred embodiment of the present invention.
Figure 31:
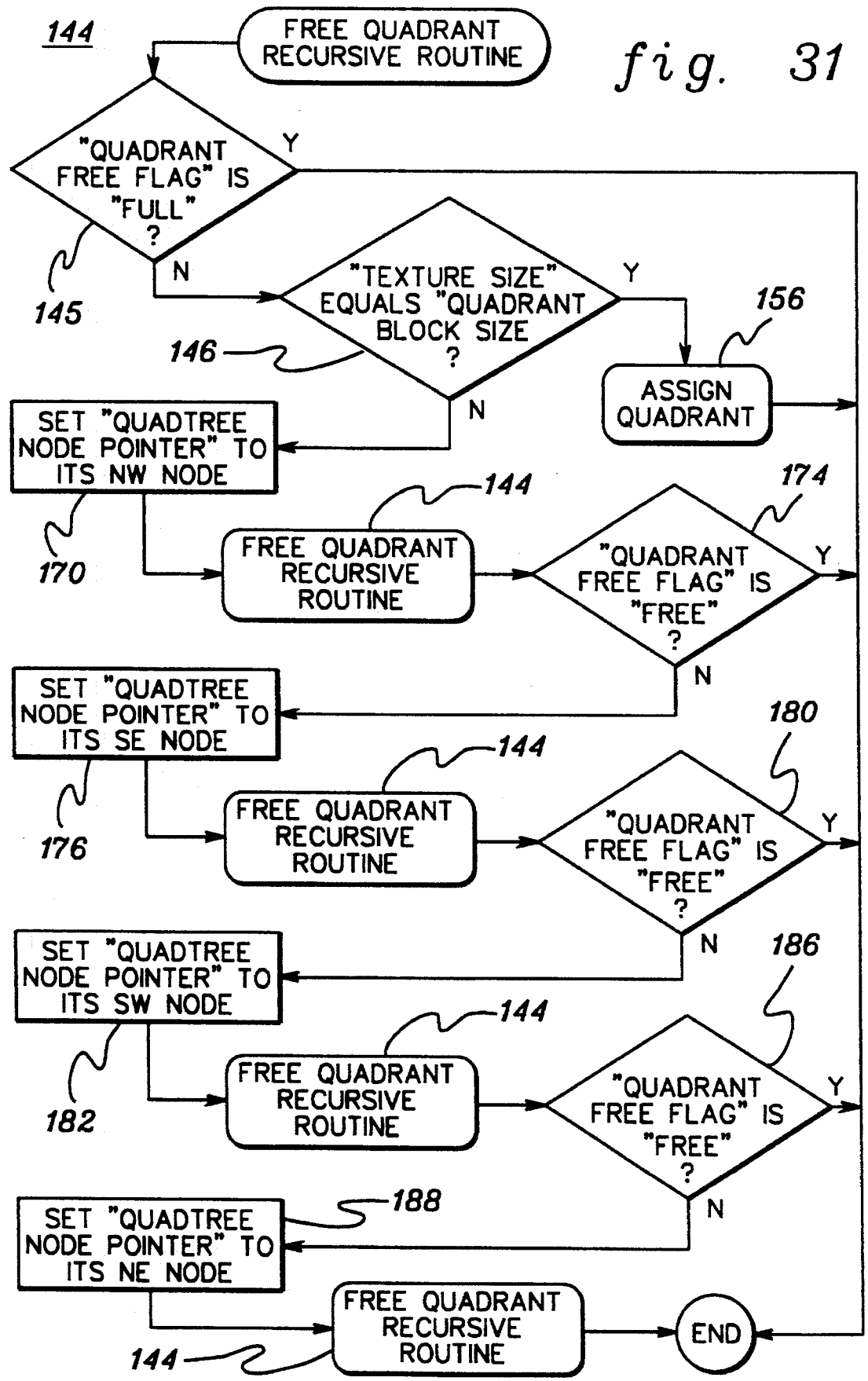
Figure 32:
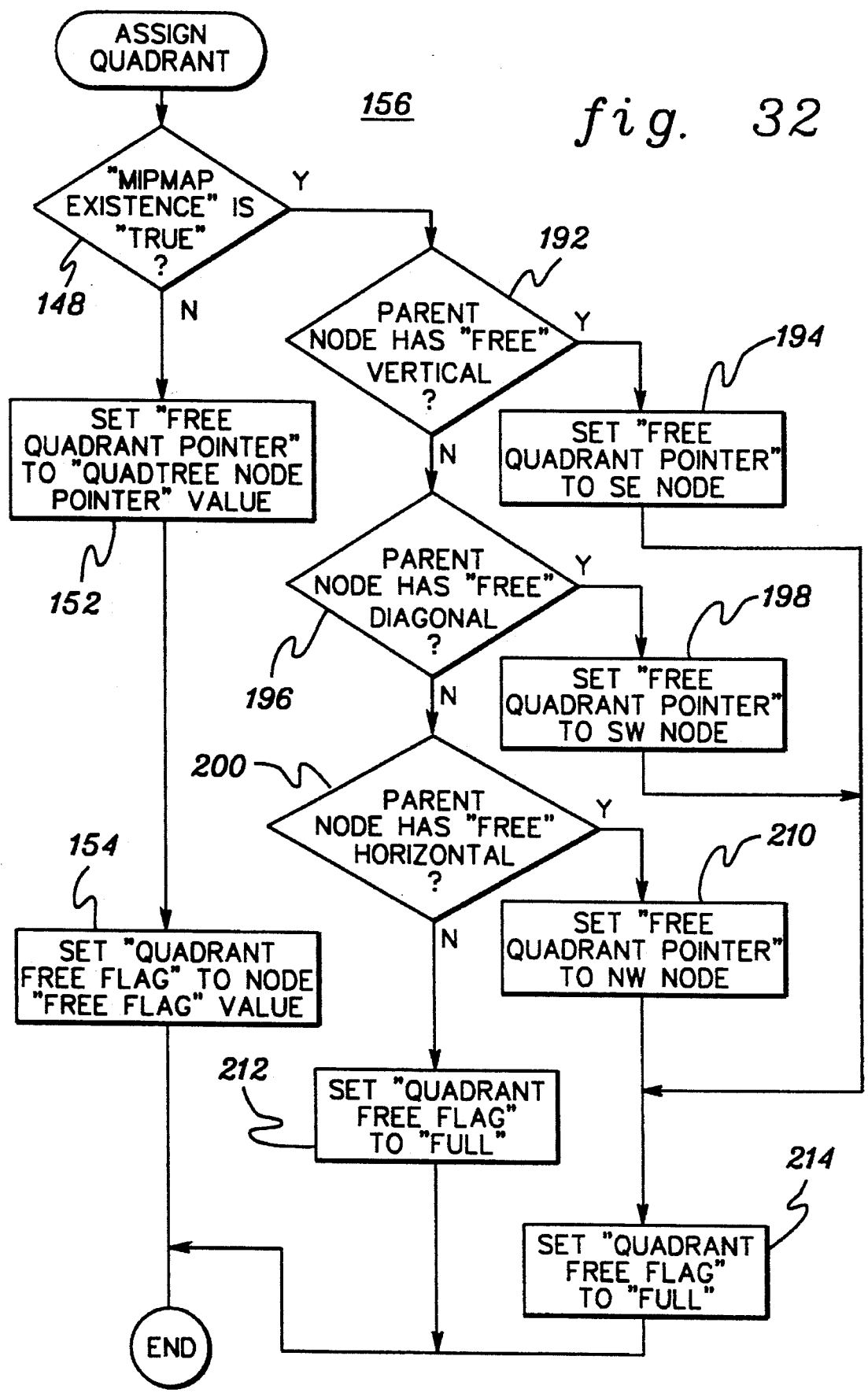

FIGS. 30–32 are logic flow diagrams illustrating the operation of a graphics memory manager according to a preferred embodiment of the present invention. The graphics memory manager described below corresponds to texture manager 14 of FIG. 1. The operation of the manager is limited to plain or base textures that are square (and having square or rectangular mip maps), but the manager's operation is extended to handle textures that are rectangular in shape (i.e. having a shape described as $2^M \times 2^N$) in a later section.

As discussed earlier, the use of the word "pointer" in the following description is not intended to imply that the quadtree can only be implemented using pointers. Also, the use of the word "recursive" in the flow diagrams and in the following description is not intended to limit implementation of this algorithm to recursive function calls. As one skilled in the art will recognize, any recursive function may be implemented in an iterative fashion. In fact, although the recursive algorithm is preferred with the linked list quadtree embodiment, the iterative algorithm is generally paired with the static array quadtree embodiment.

FIG. 30

FIG. 30 illustrates the top level of operation of the texture manager. Prior to step 140, texture data corresponding to a texture map has been received from host processor 10. This data includes the size of the 3D texture map and a flag indicating whether the map has square mip maps. In step 140, the texture manager stores the current texture size in its local memory, and sets a mip map existence flag to TRUE or FALSE, as appropriate for the current texture data. In step 142 a quadtree node pointer, used to store the current quadrant search location, is initialized to the quadtree root pointer of the root node. In step 144, a FREE QUADRANT RECURSIVE ROUTINE is called. This routine is illustrated in FIGS. 31 and 32, and its purpose is to locate a storage location for either a plain texture or a base texture with mip maps within the texture buffer. This routine is described in greater detail in the next section.

Following completion of the FREE QUADRANT RECURSIVE ROUTINE, processing returns to step 158 (in FIG. 30). If the quadrant free flag is FREE, then processing continues to step 162. Otherwise, in step 160, garbage collection is performed to make room for the new texture to be stored. As a texture or textures (and mip maps in some cases) are removed, the block free flags pointing to the quadrants emptied must be updated from completely or partially allocated (FULL or PART respectively), to FREE. Following garbage collection, a new traversal begins with step 142.

In step 162, either the plain texture or base texture is transferred to the location stored in the free quadrant pointer. Following this transfer, the block free flag for the current node is set to FULL, and the parent block's free flag is set to PART.

In step 164, if the mip map existence flag is TRUE, then in step 166 the associated mip maps are transferred into the NE sibling quadrant of the quadrant pointed to by the free quadrant pointer. Following this transfer, the block free flag for the node pointing to the NE sibling quadrant is set to PART, and its orientation attribute is set to indicate the types of mip map orientations stored in the NE quadrant. Processing then ends in step 168. On the other hand, in step 164, if the mip map existence flag is FALSE, then processing ends with step 168.

FIG. 31

The quadtree is traversed in search of a storage location, as shown in FIG. 31. In step 145, if the quadrant is completely FULL, none of its descendants need be checked, and this level of the recursion is aborted. If the quadrant is not completely FULL, processing again continues with a size comparison test, in step 146, in which the texture size of either a plain or base texture is compared with the current quadrant block size. If the sizes are equal, then the comparison test is passed and processing continues by assigning the quadrant in step 156, as described below. Otherwise, the comparison test is failed and processing continues to steps 170–188. These steps recursively call the FREE QUADRANT RECURSIVE ROUTINE to traverse lower levels of the quadtree using a pre-determined search order until the size comparison test is passed in step 146.

In step 170, the quadtree node pointer is set to the value corresponding to the NW child node of the current node, and the FREE QUADRANT RECURSIVE ROUTINE in step 144 is called. In step 174, if the quadrant free flag is FREE, then the routine ends. Otherwise, in step 176 the quadtree node pointer is set to the value of its sibling SE node pointer, and the FREE QUADRanT RECURSIVE ROUTINE in step 144 is called again. In step 180, if the quadrant free flag is FREE, then the routine ends. Otherwise, in step 182, the quadtree node pointer is set to the value of its sibling SW node pointer, and the FREE QUADRANT RECURSIVE ROUTINE in step 144 is called a third time.

In step 186, if the quadrant free flag is FREE, then the routine ends. Otherwise, in step 188, the quadtree node pointer is set to the value of its sibling NE node pointer and the FREE QUADRANT RECURSIVE ROUTINE in step 144 is called for the fourth and final quadrant. When processing returns from this final recursive call, it will continue at the previous (higher) recursive level, with step 174, 180, 186 or at the end of the FREE QUADRANT RECURSIVE ROUTINE.

FIG. 32

FIG. 32 illustrates the ASSIGN QUADRANT algorithm. In step 148, the state of the mip map existence flag is tested. If this flag is FALSE, then in step 152 a free quadrant pointer, which indicates the location of the free quadrant in the texture buffer and quadtree, is set to the value of the quadtree node pointer. Next, in step 154 a quadrant free flag is set to the value of the current node's block free flag.

Otherwise, in step 148, if the mip map existence flag is TRUE, then in steps 192–214, the parent node is searched for a storage location for a base texture with square mip maps using a pre-determined searching order different from that used in FIG. 31. The searching order is different so as to minimize allocation conflicts with the storage of plain textures (which includes base textures with rectangular mip maps as discussed earlier) and to make the packing of the texture buffer more efficient.

In step 192, a test is made to determine if both the SE quadrant for the current group of four sibling nodes is FREE and the NE quadrant can store a series of mip maps with a vertical orientation. If this test is passed, then in step 194 the free quadrant pointer is set to the value of the SE node pointer. Otherwise, processing continues to step 196.

In step 196, a test is made to determine if both the SW quadrant for current group of four sibling nodes is FREE and the NE quadrant can store a series of mip maps with a diagonal orientation. If this test is passed, then in step 198 the-free quadrant pointer is set to the value of the SW node pointer. Otherwise, processing continues to step 200.

In step 200, a test is made to determine if both the NW quadrant for current group of four sibling nodes is FREE and the NE quadrant can store a series of mip maps with a horizontal orientation. If this test is passed, then in step 210 the-free quadrant pointer is set to the value of the NW node pointer. Otherwise, processing continues to step 212 where the quadrant free flag is set to FULL. The routine then ends.

Following steps 194, 198, or 210, in step 214 the quadrant free flag is set to FREE. The routine then ends.

Handling Non-Square Textures

Figure 33:
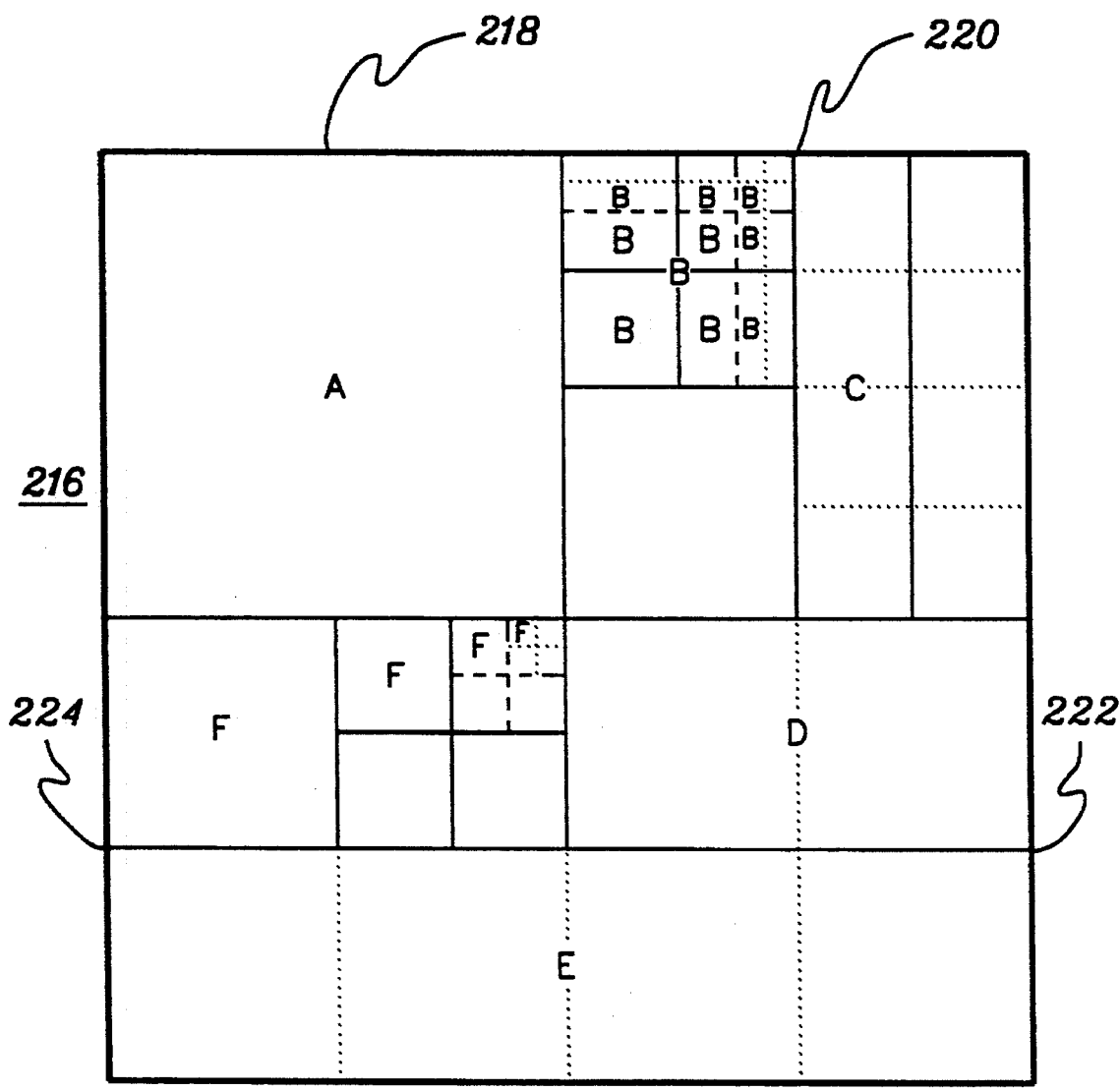
FIGS. 33 and 34 illustrate the storage according to the present invention of rectangular texture maps within a two-dimensional texture buffer and the corresponding memory state representation in the quadtree.
Figure 34:
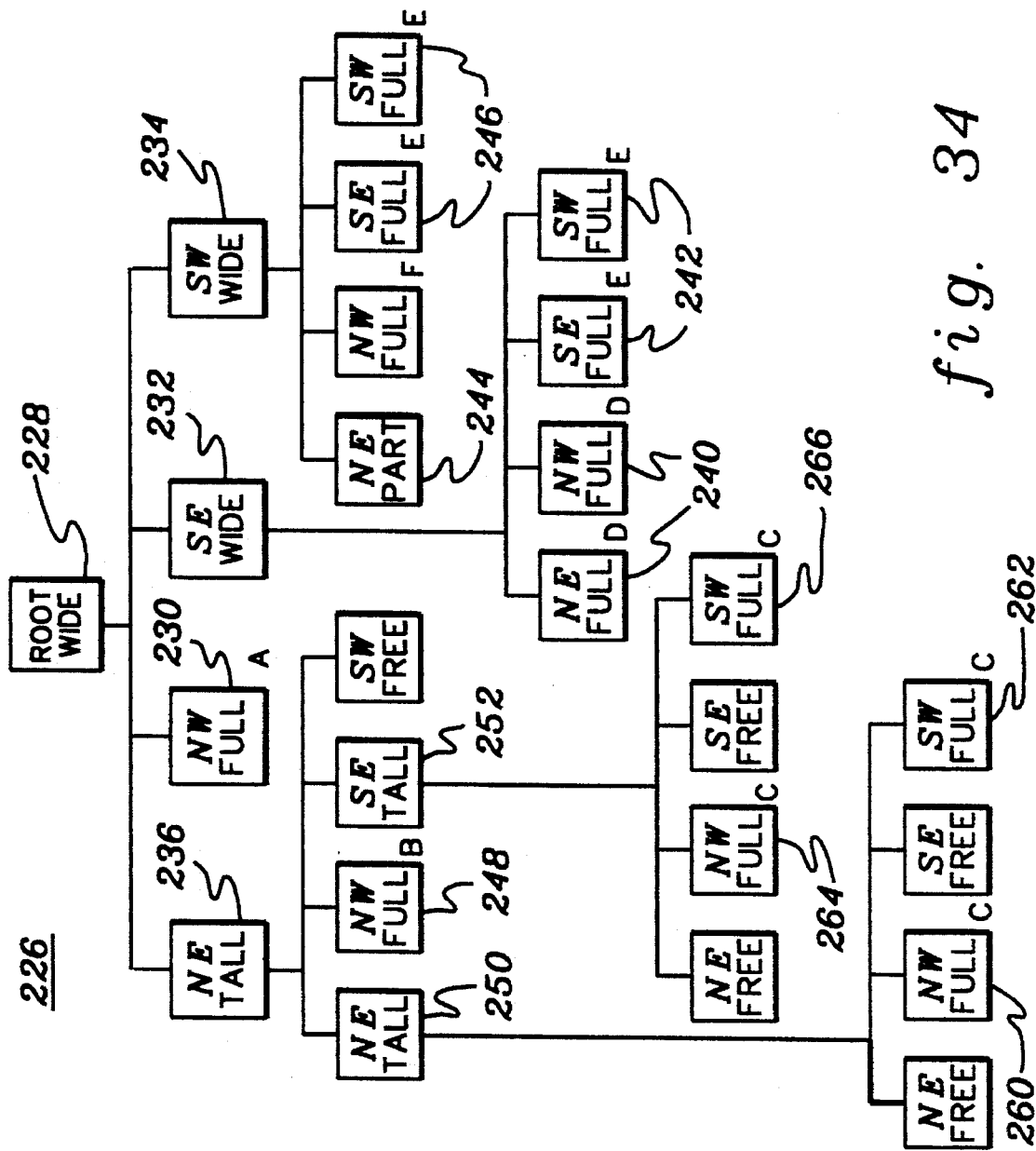

FIGS. 33 and 34 illustrate the storage according to the present invention of rectangular texture maps within a two-dimensional texture buffer and the corresponding memory state representation in the quadtree. The algorithm for the operation of the texture manager described above can be expanded to provide support for texture maps that are rectangular, rather than simply square. It should be noted that, in the preferred embodiment, texture rectangles still have dimensions that are powers of two (that is, have size $2^M \times 2^N$). This also includes support for one-dimensional texture maps having a size of $2^N \times 1$. Note that a texture that is rectangular is a different concept than that of square base textures with rectangular mip maps, as discussed earlier.

When a block free flag is set to partially-allocated and rectangular textures are stored within that quadrant, the node pointing to that quadrant has an additional orientation attribute associated therewith to indicate the longer dimension of the textures. This rectangle orientation attribute may be used in conjunction with mip map orientation attributes as required. An example of this is given in the SW quadrant of the texture buffer shown in FIGS. 33 and 34, as described below.

Texture rectangles are stored in a quadrant whose size corresponds to the longer dimension of the texture rectangles. Thus, it is not possible to have a single quadrant contain both "tall, thin" and "short, wide" texture rectangles on the same quadtree level.

FIG. 33 illustrates a texture buffer 216 of size 128×128 that is simultaneously storing square and rectangular textures. Specifically, NWquadrant 218 is storing one square texture of size 64×64. NE quadrant 220 is storing one 32×32 square texture, plus one 16×64 rectangular texture. SE quadrant 222 and SW quadrant 224 share one 128×32 rectangular texture. In addition, SE quadrant 222 contains a 64×32 rectangular texture, while SW quadrant 224 is storing a 64×64 square base texture with square mip maps.

FIG. 34 illustrates a quadtree 226 corresponding to texture buffer 216. Root node 228 has a block free flag set to "WIDE", indicating partial allocation with a "wide" rectangle orientation because of the shortwide texture E spanning the full width of the buffer. NW node 230 has a flag set to FULL because a single texture A fills the NW quadrant 218.

SE and SW nodes 232 and 234 have flags set to WIDE because texture E spans (at least) the full width of each quadrant. In fact, SE node 232 has two short-wide textures D and E which completely span quadrant 222. Its NE and NW child nodes 240 are FULL with texture D as indicated, and its SE and SW child nodes 242 are FULL with (the right half of) texture E. The SW node 234 also contains a mip map orientation indicating horizontal mip maps F within the corresponding quadrant block 224. This mipmap orientation is also included in its child NE node 244. The SE and SW child nodes 246 are FULL with (the left half of) texture E.

The NE node 236 has a flag set to TALL, indicating partial allocation with tall-thin texture C spanning the full height of the NE quadrant 220. Its NW node 248 is FULL with texture B, while its NE and SE nodes 250 and 252 are divided in the TALL direction. The NW and SW children of the latter two nodes (260, 262,264 and 266) are all FULL with texture C.

Advantages

An important advantage of the present invention is that the texture buffer is addressed two-dimensionally. Because the texture maps stored two-dimensionally within a texture buffer having a size that is a power of two, texels within the maps can be addressed by shifting the texture coordinates for the texels by a fixed number of bits; specifically, by the number of address bits required to represent the full texture buffer width. This is important because the addressing logic used for the texture buffer can be hard-wired, thus avoiding the variable load and multiplication logic required to individually address two-dimensional textures within one-dimensional memory.

In addition, if the frame buffer 18 and texture buffer 20 are not independent data storage areas as depicted in FIG. 1, but are combined into a single memory location, then this form of texture addressing allows textures to be rendered directly into the texture buffer; even while other textures are simultaneously active. Rendered textures are useful in many applications, such as reflection mapping (where the mirrored image is a display of the reflected objects), or procedural texturing (where, for example, a fractal algorithm is used to create realistic marble patterns).

Although the present invention has been described in detail above, it is not intended to be limited to the specific form set forth herein, but, on the contrary, it is intended to cover such alternatives and equivalents as can reasonably be included within the spirit and scope of the invention as defined by the appended claims.

We claim:

1. In a computer graphics system, a memory manager for storing a plurality of variable-sized two-dimensional storage areas, comprising:

a two-dimensionally addressed graphics memory having a size equal to or greater than the largest of said two-dimensional storage areas;

a quadtree for storing data regarding the state of said graphics memory and having a plurality of nodes, each of said nodes directly corresponding to a portion of said graphics memory;

an allocation attribute for each of said nodes, each allocation attribute being selected from the group consisting of free, partially-allocated, or full, where said free attribute corresponds to a completely empty portion of said graphics memory, said partially-allocated attribute corresponds to a partially full portion of said graphics memory, and said full attribute corresponds to a completely allocated portion of said graphics memory, wherein said partially-allocated attribute further indicates a mip map storage orientation for a base texture map having square mip maps associated and stored therewith in said graphics memory; and allocation means for storing said two-dimensional storage areas within said graphics memory responsive to said state of said graphics memory stored in said quadtree.

2. The memory manager of claim 1 wherein said graphics memory is subdivided by said allocation means, as necessary to store said storage areas, into a first level of quadrants of equal two-dimensional size.

3. The memory manager of claim 2 wherein at least one of said first-level quadrants is further subdivided by said allocation means, as necessary to store said storage areas, into quadrants on one or more descending levels, each of said quadrants on said descending levels being of equal two-dimensional size when located on the same level.

4. The memory manager of claim 3 wherein at least one of said quadrants, located on said first or descending levels, is subdivided into a plurality of rectangular blocks of two-dimensional size where the longer dimension of said blocks is equal to the dimension of said quadrant.

5. The memory manager of claim 3 wherein said quadtree is a hierarchy with said nodes arranged on a plurality of levels as parent nodes and child nodes, each of said parent nodes having a set of four child nodes corresponding to the subdivision of a higherlevel quadrant in said graphics memory directly corresponding to said parent node into lower-level quadrants, each of said child nodes in said set directly corresponding to one of said lower-level quadrants.

6. The memory manager of claim 5 wherein each of said nodes in said quadtree has a directional attribute corresponding to one of four orthogonal directions, each of said orthogonal directions corresponding to the same relative position in said graphics memory.

7. The memory manager of claim 6 wherein said partially-allocated attribute further indicates a rectangular storage orientation for one or more storage areas having unequal dimensions.

8. The memory manager of claim 7 wherein said unequal dimensions comprise a shorter dimension that is a power of two and a longer dimension that is equal to the dimension of said quadrant.

9. The memory manager of claim 6 wherein said allocation means subdivides said graphics memory with a positional preference corresponding to a predetermined sequence of said orthogonal directions ordered as first, second, third, and fourth subdivision directions.

10. The memory manager of claim 9 wherein said allocation means stores a base texture map and associated square mip maps with a positional preference corresponding to a pre-determined sequence of said orthogonal directions ordered as first, second, and third mip map directions, said first mip map direction being 180° opposite to said first subdivision direction and said second and third mip map directions not equal to said fourth subdivision direction.

11. The memory manager of claim 9 wherein said allocation means performs garbage collection when necessary to store one of said storage areas.

12. The memory manager of claim 5 wherein a base texture map and associated rectangular mip maps are stored by said allocation means in a manner substantially similar to that for storing a plain texture map of size comparable to that required by said base texture map and associated rectangular mip maps.

13. The memory manager of claim 5 wherein said allocation means subdivides said graphics memory based upon a comparison of the size of said storage areas with the size of the quadrants on a level of said quadtree.

14. The memory manager of claim 13 wherein said allocation means subdivides said graphics memory based upon mip map type for any of said storage areas corresponding to a base texture map having associated mip maps.

15. The memory manager of claim 3 wherein said storage areas comprise texture maps or mip maps.

16. The memory manager of claim 15 wherein said storage areas are square with dimensions that are a power of two.

17. The memory manager of claim 1 wherein at least two of said storage areas cohabitate within said graphics memory.

18. The memory manager of claim 1 wherein said allocation means stores a first storage area into said graphics memory while a second storage area is active.

19. The memory manager of claim 1 wherein each of said storage areas is stored in said graphics memory such that each successive row of a storage area starts in the same column of said graphics memory for every row thereof.

20. The memory manager of claim 1 wherein the addresses of said storage areas within said graphics memory are determined using a fixed row size that is a power of two.

21. A computer graphics system for storing a plurality of variable-sized two-dimensional texture maps, comprising:

a two-dimensionally addressed texture buffer having a size equal to or greater than the largest of said two-dimensional texture maps;

a quadtree for storing data regarding the state of said texture buffer and having a plurality of nodes, each of said nodes directly corresponding to a portion of said texture buffer;

an allocation attribute for each of said nodes, each allocation attribute selected from the group consisting of free, partially-allocated, or full, where said free attribute corresponds to a completely empty portion of said texture buffer, said partially-allocated attribute corresponds to a partially full portion of said texture buffer, and said full attribute corresponds to a completely allocated portion of said texture buffer, wherein said partially-allocated attribute further includes a mip map storage orientation for a base texture map having square mip maps associated and stored therewith in said texture buffer; and a texture manager, coupled to said texture buffer, using a procedure for allocating and storing said two-dimensional texture maps within said texture buffer responsive to said state thereof stored in said quadtree, said texture manager providing an update of said state to said quadtree when storing at least one texture map.

22. The system of claim 21 wherein said texture buffer is subdivided by said texture manager, as necessary to store said texture maps, into a first level of quadrants of equal two-dimensional size, and said first-level quadrants are further subdivided, as further necessary to store said texture maps, into quadrants on one or more descending levels corresponding to and below said first-level quadrant, each of said quadrants on said descending levels decreasing in area by a factor of four relative to the next higher level, but each of equal two-dimensional size when located on the same level.

23. The system of claim 22 wherein said quadtree is a hierarchy with said nodes arranged on a plurality of levels as parent nodes and child nodes, each of said parent nodes having a set of four child nodes, said set corresponding to a subdivision of a level of said texture buffer into quadrants, each of said child nodes in a set directly corresponding to a quadrant for a common level of said texture buffer.

24. The system of claim 23 wherein each of said nodes in said quadtree has a directional attribute corresponding to one of four orthogonal directions in a two-dimensional plane, each of said orthogonal directions corresponding to the same relative position in said texture buffer.

25. The system of claim 24 wherein said texture manager subdivides said texture buffer with a positional preference corresponding to a pre-determined sequence of said orthogonal directions.

26. The system of claim 25 further comprising:

a host processor coupled to said texture manager that provides graphics data thereto corresponding to said texture maps; and a raster subsystem, coupled between said host processor and said texture buffer, that provides two-dimensional texture coordinates to said texture buffer and accepts corresponding texel values therefrom.

27. In a computer graphics system for storing a plurality of variable-sized two-dimensional texture maps, each having a base texture size, in a two-dimensionally addressed texture buffer having a memory space managed as a hierarchy of parent and child quadrants with four child quadrants of memory space corresponding to a parent quadrant, said system having a quadtree for storing data regarding the state of said texture buffer and having a plurality of nodes arranged in a hierarchy corresponding to said hierarchy for said texture buffer, each of said nodes having at least one allocation flag such that there is a plurality of allocation flags for said nodes, each of said nodes directly corresponding to one of said quadrants of said texture buffer, and each of said nodes having a directional attribute corresponding to one of four orthogonal directions in a two-dimensional plane corresponding to said texture buffer, each of said orthogonal directions corresponding to the same relative position in said texture buffer for all quadrants thereof, a method comprising the steps of:

performing a comparison of said base texture size with said quadrant size for a texture map to be stored;

traversing said quadtree responsive to said comparison with a positional preference corresponding to a pre-determined sequence of said orthogonal directions ordered as first, second, third, and fourth subdivision directions;

setting at least one of said allocation flags for at least one of said nodes in said quadtree during said traversing to a state indicating a storage status of the quadrant corresponding to said node; and storing said texture map in said texture buffer responsive to said state of at least one of said allocation flags.

28. The method of claim 27 wherein said step of traversing further comprises traversing said quadtree until said base texture size substantially equals said quadrant size.

29. The method of claim 28 wherein said texture maps comprise mip maps.

30. The method of claim 28 further comprising the steps of:

making a determination whether said texture map includes mip maps; and traversing said quadtree responsive to said determination.

31. The method of claim 30 wherein said step of traversing comprises traversing said quadtree with a positional preference corresponding to a pre-determined sequence of three of said orthogonal directions excluding said fourth subdivision direction.

32. The method of claim 31 wherein said allocation flag comprises the states of free, partially-allocated, or full, where said free attribute corresponds to a completely empty quadrant, said partially-allocated attribute corresponds to a quadrant storing at least one texture map of a size less that of the quadrant, and said full attribute corresponds to a quadrant storing a single texture map of a size equal to that of the quadrant.

* * * * *